(12) United States Patent
Wachter et al.

(10) Patent No.: US 12,204,053 B2
(45) Date of Patent: *Jan. 21, 2025

(54) LIDAR PULSE ELONGATION

(71) Applicant: Waymo LLC, Mountain View, CA (US)

(72) Inventors: Luke Wachter, San Francisco, CA (US); Pierre-Yves Droz, Los Altos, CA (US); Clayton Kunz, Mill Valley, CA (US)

(73) Assignee: Waymo LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/487,768

(22) Filed: Oct. 16, 2023

(65) Prior Publication Data

US 2024/0045037 A1 Feb. 8, 2024

Related U.S. Application Data

(63) Continuation of application No. 17/932,121, filed on Sep. 14, 2022, now Pat. No. 11,892,567, which is a
(Continued)

(51) Int. Cl.
*G01S 7/4861* (2020.01)
*G01S 7/497* (2006.01)
(Continued)

(52) U.S. Cl.
CPC ............ *G01S 7/4861* (2013.01); *G01S 7/497* (2013.01); *G01S 17/04* (2020.01); *G01S 17/931* (2020.01)

(58) Field of Classification Search
CPC ........ G01S 7/4861; G01S 7/497; G01S 17/04; G01S 17/931; G01S 7/4802
(Continued)

(56) References Cited

U.S. PATENT DOCUMENTS 5,424,823 A 6/1995 Nettles et al.
6,199,794 B1 3/2001 Naiman et al.
(Continued)

FOREIGN PATENT DOCUMENTS

CN 111208527 A 5/2020
KR 10-2015-0049934 A 5/2015
WO 2012087150 A1 6/2012

OTHER PUBLICATIONS

International Search Report and Written Opinion of the International Searching Authority for PCT/US21/14865; mailed On Oct. 18, 2021.
(Continued)

*Primary Examiner* — Daniel L Murphy
(74) *Attorney, Agent, or Firm* — McDonnell Boehnen Hulbert & Berghoff LLP

(57) ABSTRACT

Systems and methods are disclosed to identify a presence of a volumetric medium in an environment associated with a LIDAR system. In some implementations, the LIDAR system may emit a light pulse into the environment, receive a return light pulse corresponding to reflection of the emitted light pulse by a surface in the environment, and determine a pulse width of the received light pulse. The LIDAR system may compare the determined pulse width with a reference pulse width, and determine an amount of pulse elongation of the received light pulse. The LIDAR system may classify the surface as either an object to be avoided by a vehicle or as air particulates associated with the volumetric medium based, at least in part, on the determined amount of pulse elongation.

20 Claims, 10 Drawing Sheets

Related U.S. Application Data continuation of application No. 16/240,126, filed on Jan. 4, 2019, now Pat. No. 11,513,198.

(51) Int. Cl.
  *G01S 17/04* (2020.01)
  *G01S 17/931* (2020.01)
(58) Field of Classification Search
  USPC .......................................................... 356/4.01
  See application file for complete search history.

(56) References Cited

U.S. PATENT DOCUMENTS

| | | |
|---|---|---|
| 8,577,538 B2 | 11/2013 | Lenser et al. |
| 8,818,609 B1 | 8/2014 | Boyko et al. |
| 8,983,705 B2 | 3/2015 | Zhu et al. |
| 9,234,618 B1 | 1/2016 | Zhu et al. |
| 9,304,154 B1 | 4/2016 | Droz et al. |
| 9,753,126 B2 | 9/2017 | Smits |
| 9,910,157 B2 | 3/2018 | Heo et al. |
| 10,556,585 B1 | 2/2020 | Berger et al. |
| 11,513,198 B2 | 11/2022 | Wachter et al. |
| 2010/0277713 A1 | 11/2010 | Mimeault |
| 2011/0313722 A1 | 12/2011 | Zhu et al. |
| 2014/0307247 A1 | 10/2014 | Zhu et al. |
| 2018/0060725 A1 | 3/2018 | Groh et al. |
| 2018/0284226 A1 | 10/2018 | LaChapelle et al. |
| 2019/0212414 A1 | 7/2019 | Esfahany et al. |

OTHER PUBLICATIONS

Reflection and Snell's Law, GeoSci Developers, downloaded Oct. 14, 2021 from https://em.geosci.xyz/content/maxwell1_fundamentals/reflection_and_refraction/Snells_law.html, 4 pages. (Year: 2018).
Air Pollution Fog Detection through Vehicular Sensors, Sallis et al., 2014 8th Asia Modelling Symposium, 6 pages. (Year: 2014).

710

Compare the determined pulse width with a pulse width of light reflected from a road surface to determine a pulse elongation difference value. (711)

↓

Identify the surface as debris on the road surface based, at least in part, on the determined pulse elongation difference value. (712)

Determine a peak amplitude of the received light pulse. (801)

↓

Select one of the plurality of reference pulse widths based on the determined peak amplitude. (802)

↓

Compare the measured pulse width with the selected reference pulse width. (803)

Determine a first time at which a magnitude of the received light pulse rises above a value. (811)

Determine a second time at which the magnitude of the received light pulse falls below the value. (812)

820 ↘

Determine a peak amplitude of the received light pulse. (821)

Retrieve the reference pulse width from a look-up table based on the determined peak amplitude. (822)

LIDAR PULSE ELONGATION

CROSS-REFERENCE TO RELATED APPLICATIONS

This application is a continuation application of U.S. application Ser. No. 17/932,121 filed Sep. 14, 2022, which is a continuation application of U.S. application Ser. No. 16/240,126 filed Jan. 4, 2019 and issued as U.S. Pat. No. 11,513,198 on Nov. 29, 2022. The contents of each of which are hereby incorporated by reference.

TECHNICAL FIELD

This disclosure relates generally to LIDAR devices and systems, and more specifically to identifying features of an environment based, at least in part, on pulse elongation.

BACKGROUND

Vehicles may be configured to operate in an autonomous or semi-autonomous mode and navigate through an environment with little or no input from a driver. These autonomous and semi-autonomous vehicles typically include a number of sensors configured to determine information about the environment in which the vehicle operates. The sensors may include one or more light detection and ranging (LIDAR) devices that can detect multiple objects (such as other vehicles, pedestrians, traffic signals, obstacles, and so on) in the environment and determine distances between the autonomous vehicle and the multiple objects. Autonomous and semi-autonomous vehicles may also include other types of sensors including, for example, sonar devices, radar devices, cameras, and audio sensing devices. Data from one or more of these sensors may be used by a controller or computing device to determine various features and characteristics of the detected objects such as, for example, position, size, shape, type, movement, and orientation.

A LIDAR system, which may include one or more LIDAR devices and one or more controllers or computing devices, may estimate distances to a number of objects and other features while scanning an environment to generate a point cloud of reflective surfaces in the environment. Individual points in the point cloud may be determined by emitting light pulses into the environment and detecting return light pulses that were reflected from objects and other reflective surface in the environment. Timing information of the emitted light pulses and the return light pulses may provide continuous real-time or near real-time estimates of distances between a LIDAR device and objects detected in the environment, and characteristics of the return light pulses may be used to determine relative orientations of the detected objects. The estimated distances and determined orientations of the detected objects may be used to generate a three-dimensional map of points indicative of locations of reflective surfaces in the environment. The three-dimensional map may be represented by or associated with the point cloud.

SUMMARY

This Summary is provided to introduce in a simplified form a selection of concepts that are further described below in the Detailed Description. This Summary is not intended to identify key features or essential features of the claimed subject matter, nor is it intended to limit the scope of the claimed subject matter.

One innovative aspect of the subject matter described in this disclosure can be implemented as a method for identifying a presence of a volumetric medium in an environment. The method may include emitting a light pulse into the environment, receiving a return light pulse corresponding to reflection of the emitted light pulse by a surface in the environment, determining a pulse width of the received light pulse, comparing the determined pulse width with a reference pulse width, determining an amount of pulse elongation of the received light pulse based on the comparing, and classifying the surface as either an object to be avoided or as air particulates associated with the volumetric medium based, at least in part, on the determined amount of pulse elongation. In some implementations, the reference pulse width may be based, at least in part, on one or more reference light pulses reflected from a surface orthogonal to a direction of the emitted light pulses. The volumetric medium may include air particulates from which photons associated with return light pulses are scattered. The air particulates may include at least one of exhaust, aerosol, dust, pollution, smoke, rain, or fog.

In some implementations, the determined pulse width may be compared with the reference pulse width by determining a peak amplitude of the received light pulse, selecting one of a plurality of reference pulse widths based on the determined peak amplitude, and comparing the determined pulse width with the selected reference pulse width. In other implementations, the method may include determining a peak amplitude of the received light pulse, and retrieving the reference pulse width from a look-up table based on the determined peak amplitude. The look-up table may store a plurality of reference pulse widths each associated with a corresponding one of a plurality of different peak amplitudes.

The method may also include generating a corresponding point in a point cloud indicative of objects detected in the environment based on at least one of the classification of the surface and the determined amount of pulse elongation. In addition, or in the alternative, the method may include comparing the determined pulse width with a pulse width of light reflected from a road surface to determine a pulse elongation difference value, and identifying the surface as debris on the road surface based, at least in part, on the determined pulse elongation difference value.

Another innovative aspect of the subject matter described in this disclosure can be implemented in a LIDAR system that may identify a presence of a volumetric medium in an environment. In some implementations, the LIDAR system may include a light emitter configured to emit a light pulse into the environment, a photodetector configured to receive a return light pulse corresponding to reflection of the emitted light pulse by a surface in the environment, a number of processing channels, and a controller. The processing channels may be configured to determine a pulse width of the received light pulse, to compare the determined pulse width with a reference pulse width, and to determine an amount of pulse elongation of the received light pulse based on the comparison. The controller may be configured to classify the surface as either an object to be avoided or as air particulates associated with the volumetric medium based, at least in part, on the determined amount of pulse elongation. The volumetric medium may include air particulates from which photons associated with return light pulses are scattered. The air particulates may include at least one of exhaust, aerosol, dust, pollution, smoke, rain, or fog.

In some implementations, the determined pulse width may be compared with the reference pulse width by determining a peak amplitude of the received light pulse, selecting one of a plurality of reference pulse widths based on the determined peak amplitude, and comparing the determined pulse width with the selected reference pulse width. In other implementations, the LIDAR system may determine the peak amplitude of the received light pulse, and may retrieve the reference pulse width from a look-up table based on the determined peak amplitude. The look-up table may store a plurality of reference pulse widths each associated with a corresponding one of a plurality of different peak amplitudes.

The LIDAR system may also include circuitry configured to generate a corresponding point in a point cloud indicative of objects detected in the environment based on at least one of the classification of the surface and the determined amount of pulse elongation. In addition, or in the alternative, the processing channels may be configured to compare the determined pulse width with a pulse width of light reflected from a road surface to determine a pulse elongation difference value, and the controller may be further configured to identify the surface as debris on the road surface based, at least in part, on the determined pulse elongation difference value.

Another innovative aspect of the subject matter described in this disclosure can be implemented in a LIDAR system that can identify a presence of a volumetric medium in an environment. In some implementations, the LIDAR system may include means for emitting a light pulse into the environment, means for receiving a return light pulse corresponding to reflection of the emitted light pulse by a surface in the environment, means for measuring a pulse width of the received light pulse, means for comparing the measured pulse width with a reference pulse width, means for determining an amount of pulse elongation of the received light pulse based on the comparing, and means for classifying the surface as either an object to be avoided or as air particulates associated with the volumetric medium based, at least in part, on the determined amount of pulse elongation. The volumetric medium may include air particulates from which photons associated with return light pulses are scattered. The air particulates may include at least one of exhaust, aerosol, dust, pollution, smoke, rain, or fog.

In some implementations, the LIDAR system may include means for determining a peak amplitude of the received light pulse and means for retrieving the reference pulse width from a look-up table based on the determined peak amplitude, wherein the look-up table stores a plurality of reference pulse widths each associated with a corresponding one of a plurality of different peak amplitudes of respective reference light pulses. The LIDAR system may also include means for emitting a plurality of light pulses during a calibration operation, means for receiving a plurality of reference light pulses reflected by an orthogonal surface relative to a direction of the emitted light pulse, means for determining a reference pulse width for each of the plurality of received reference light pulses, and means for storing the reference pulse widths in a memory associated with the LIDAR system.

The LIDAR system may also include means for generating a corresponding point in a point cloud indicative of objects detected in the environment based on at least one of the classification of the surface and the determined amount of pulse elongation. In addition, or in the alternative, the LIDAR system may include means for comparing the determined pulse width with a pulse width of light reflected from a road surface to determine a pulse elongation difference value, and means for identifying the surface as debris on the road surface based, at least in part, on the determined pulse elongation difference value.

Another innovative aspect of the subject matter described in this disclosure can be implemented in a vehicle configured to identify a presence of a volumetric medium in an environment. In some implementations, the vehicle may include a light emitter configured to emit a light pulse into the environment, a photodetector configured to receive a return light pulse corresponding to reflection of the emitted light pulse by a surface in the environment, at least one processing channel, and a controller. The at least one processing channel may be configured to determine a pulse width of the received light pulse, to compare the determined pulse width with a reference pulse width, and to determine an amount of pulse elongation of the received light pulse based on the comparison. The controller may be configured to classify the surface as either an object to be avoided by the vehicle or as air particulates associated with the volumetric medium based, at least in part, on the determined amount of pulse elongation. The volumetric medium may include air particulates from which photons associated with return light pulses are scattered. The air particulates may include at least one of exhaust, aerosol, dust, pollution, smoke, rain, or fog.

In some implementations, the at least one processing channel may be further configured to determine a peak amplitude of the received light pulse, and to retrieve the reference pulse width from a look-up table based on the determined peak amplitude, wherein the look-up table stores a plurality of reference pulse widths each associated with a corresponding one of a plurality of different peak amplitudes of respective reference light pulses. In addition, or in the alternative, the at least one processing channel may be further configured to compare the determined pulse width with a pulse width of light reflected from a road surface to determine a pulse elongation difference value, and the controller may be further configured to identify the surface as debris on the road surface based, at least in part, on the determined pulse elongation difference value. The controller may also be configured to generate a corresponding point in a point cloud indicative of objects detected in the environment based on at least one of the classification of the surface and the determined amount of pulse elongation.

Another innovative aspect of the subject matter described in this disclosure can be implemented as a method for identifying road debris in an environment. The method may include emitting a light pulse into the environment associated with a LIDAR device; receiving a return light pulse corresponding to reflection of the emitted light pulse by a surface in the environment; determining a pulse width of the received light pulse; comparing the determined pulse width with a reference pulse width; determining an amount of pulse elongation of the received light pulse based on the comparing; and classifying the surface as road debris to be avoided by a vehicle based, at least in part, on the determined amount of pulse elongation. The road debris may be pieces of a tire, for example. The determined pulse elongation may differ from a pulse elongation associated with the road. The pulse elongation associated with the road may be an expected pulse elongation based on previously obtained data such as from one or more of the following: the same sensor, other sensors, sensors on another car, and map data.

Details of one or more implementations of the subject matter described in this disclosure are set forth in the accompanying drawings and the description below. Other features, aspects, and advantages will become apparent from

BRIEF DESCRIPTION OF THE DRAWINGS

FIG. 7B shows a flow chart depicting an example operation for identifying debris on a road surface.

FIG. 8A shows a flow chart depicting an example operation for comparing a determined pulse width of a received light pulse with a reference pulse width.

Like reference numbers and designations in the various drawings indicate like elements.

DETAILED DESCRIPTION

Figure 1:
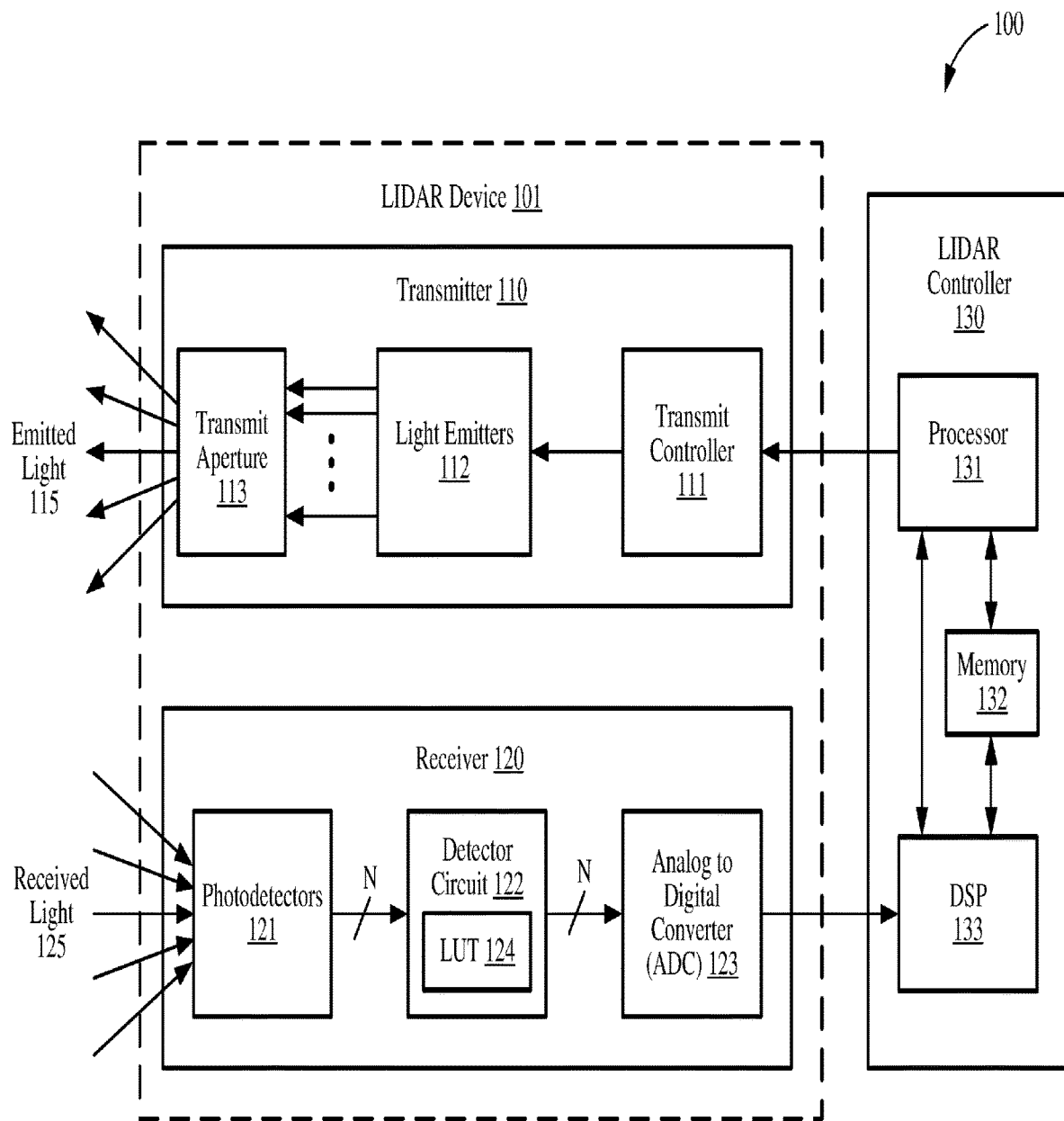
FIG. 1 shows a block diagram of an example LIDAR system.

The following description is directed to certain implementations for the purposes of describing the innovative aspects of this disclosure. However, a person having ordinary skill in the art will readily recognize that the teachings herein can be applied in a multitude of different ways. It may be readily understood that certain aspects of the disclosed systems and methods can be arranged and combined in a wide variety of different configurations, all of which are contemplated herein. The described implementations may be implemented in any device, system, or vehicle that is capable of sampling signals to determine or derive information contained in the signals. Thus, although described herein with respect to autonomous or semi-autonomous vehicles known as self-driving cars or "SDCs", aspects of the present disclosure may be implemented within other vehicles, such as cars, trucks, motorcycles, buses, boats, airplanes, helicopters, robots, unmanned aerial vehicles, lawn mowers, recreational vehicles, amusement park vehicles, farm equipment, construction equipment, trams, golf carts, trains, and trolleys. Other vehicles are possible as well. Aspects of the present disclosure may also be implemented on stationary objects or structures (such as walls, buildings, roofs, fences, and the like) as part of security systems, inventory management systems, and other suitable monitoring systems.

A LIDAR device may emit or transmit light pulses into an environment, and may receive light pulses reflected by objects and other reflective surfaces in the environment to determine information about the objects and the other reflective surfaces. In some implementations, the distance to a detected object may be determined based on a time between emission of a light pulse by the LIDAR device and reception of a corresponding reflected light pulse by the LIDAR device. The size, shape, orientation, texture, and other features of the detected object may be determined based (at least in part) on the amplitudes, pulse widths, timing information, and other characteristics of a multitude of such received light pulses. Information generated from the received light pulses may be used to generate a point cloud (or another suitable three-dimensional map of points) indicating the location, size, shape, movement, orientation, and other features of objects and other reflective surfaces detected in the environment. An autonomous or semi-autonomous vehicle may use one or more of these point clouds to navigate through the environment without human input, and thus the accuracy with which these point clouds represent objects and other surfaces in the environment may be important for safe, comfortable, or other desirable operation of the vehicle.

The shape of light pulses reflected by a surface may be indicative of a number of features or characteristics of a corresponding object (such as size, shape, and orientation of the object). For example, while the shape of a light pulse reflected by a surface orthogonal to the direction of the emitted light pulse may be the same (or nearly the same) as the shape of a corresponding emitted light pulse that illuminated the orthogonal surface, the shape of a light pulse reflected by a non-orthogonal surface (such as an inclined surface relative to the direction of the emitted light pulse) may be detectably different than the shape of the corresponding emitted light pulse that illuminated the non-orthogonal surface. More specifically, when an emitted light pulse is reflected by a non-orthogonal surface (such as the ground), photons associated with the emitted light pulse may be reflected from different portions of the non-orthogonal surface and arrive at the LIDAR device at different times, thereby spreading the reflected light in time such that light pulses received by the LIDAR device are elongated relative to the emitted light pulses that illuminated the non-orthogonal surface.

The spreading of a reflected light pulse relative to a corresponding emitted light pulse, referred to herein as pulse elongation, may be indicative of the features or characteristics of an object detected by the LIDAR device. For example, as the angle of inclination of a reflective surface relative to the direction of the emitted light pulse increases, the range of distances that photons associated with a reflected light pulse travel to the LIDAR device increases and thereby elongates the pulse width of the reflected light pulse relative to the corresponding emitted light pulse. Conversely, as the angle of inclination of the reflective surface relative to the direction of the emitted light pulse decreases, the range of distances that photons associated with the reflected light pulse travel to the LIDAR device decreases and thereby reduces the amount of pulse elongation. LIDAR systems disclosed herein may use the amount of pulse elongation exhibited by reflected light pulses to determine the shapes, orientations, and other features of objects detected in a surrounding environment.

LIDAR systems disclosed herein may also use amounts of pulse elongation exhibited by reflected light pulses to identify debris and other small objects on a road or street. For example, a piece of tire or other debris on the road may be difficult to detect by a conventional LIDAR device because of the relatively small geometrical aspects of the piece of tire (as compared to the ground). However, because the elongation of light pulses reflected by the piece of tire may be detectably different than the elongation of light pulses reflected by the road, LIDAR systems disclosed herein may use the pulse elongation of received light pulses to distinguish between light pulses reflected by the piece of tire and light pulses reflected by the road.

Pulse elongation may also be caused by air particulates associated with a volumetric medium in the environment. For example, when a light pulse encounters a volumetric medium, the air particulates may reflect different portions of the light pulse as many relatively small light pulses. Although possibly too small or weak to be detected by the LIDAR device, these relatively small light pulses may combine or constructively interfere with each other to form a relatively large light pulse that can be detected by the LIDAR device and misinterpreted as a light pulse reflected from a non-orthogonal surface (rather than from air particulates associated with a volumetric medium). More specifically, a LIDAR device configured to detect the relatively large light pulse but not the relatively small light pulses may not be able to distinguish between light pulses reflected by objects to be avoided by a vehicle and light pulses reflected by a volumetric medium through which the vehicle may traverse (such as pollution). As a result, air particulates associated with the volumetric medium may cause errors in the perception of objects and other reflective surfaces in the environment if not properly identified and classified.

Implementations of the subject matter described herein may use a LIDAR device to detect or identify a presence of a volumetric medium in an environment, which may increase the accuracy with which objects and other reflective surfaces in the environment can be perceived by a controller or computing device associated with the LIDAR device. In some implementations, a LIDAR system may include one or more LIDAR devices and one or more associated LIDAR controllers or computing devices. The LIDAR system may determine the pulse width of a light pulse reflected by a surface within the environment, may compare the determined pulse width with a reference pulse width, and may determine the amount of pulse elongation based on the comparison. In some implementations, the amount of pulse elongation may be used to classify the surface as either an object to be avoided, e.g., by an autonomous vehicle, or as air particulates associated with a volumetric medium. In addition, or in the alternative, the amount of pulse elongation may be considered when determining a corresponding point in a point cloud indicative of objects detected in the environment. In this manner, the accuracy with which the LIDAR system may determine various features or characteristics of objects and other reflective surfaces detected in the environment may be improved over conventional LIDAR systems or devices.

In some implementations, a reference pulse width may be determined for each of a plurality of amplitude values of light pulses. Each of the determined reference pulse widths may be stored, along with its amplitude and pulse characteristics, in a look-up table (LUT) or other memory provided within or otherwise accessible by the LIDAR device or system. The LIDAR system may retrieve the reference pulse width and/or the pulse characteristics (such as pulse shape) corresponding to the amplitude of the received light pulse, and use the retrieved pulse width and/or pulse characteristics to determine an amount of pulse elongation of the received light pulse caused by air particulates associated with the volumetric medium.

The term "object" as used herein may include any physical object for which it may be desirable to detect and determine its location, speed, movement, size, shape, and other features, e.g., other vehicles, pedestrians, cyclists, signs, etc. The term "volumetric medium" as used herein may include air particulates that may alter one or more characteristics of the reflected light pulses received by a LIDAR device (such as by elongating the reflected light pulses relative to their corresponding emitted light pulses). Air particulates that form a volumetric medium may include (but are not limited to) exhaust, aerosol, dust, pollution, smoke, rain, fog, or any combination thereof. In some implementations, the detected objects may include objects and other environmental features to be mapped and/or to be avoided by an autonomous or semi-autonomous vehicle.

In the following description, numerous specific details are set forth such as examples of specific components, circuits, and processes to provide a thorough understanding of the present disclosure. Also, in the following description and for purposes of explanation, specific nomenclature and/or details are set forth to provide a thorough understanding of the example embodiments. However, it will be apparent to one skilled in the art that these specific details may not be required to practice the example embodiments. In other instances, well-known circuits and devices are shown in block diagram form to avoid obscuring the present disclosure. Any of the signals provided over various buses described herein may be time-multiplexed with other signals and provided over one or more common buses. Additionally, the interconnection between circuit elements or software blocks may be shown as buses or as single signal lines. Each of the buses may alternatively be a single signal line, and each of the single signal lines may alternatively be buses, and a single line or bus might represent any one or more of a myriad of physical or logical mechanisms for communication between components. Further, the term "coupled" as used herein means coupled directly to or coupled through one or more intervening components or circuits.

FIG. 1 shows a block diagram of an example light detection and ranging (LIDAR) system 100. The LIDAR system 100 may be used to detect points or objects in an environment by emitting pulses of lights that illuminate the points or objects and then detecting light pulses reflected from the points or objects. The LIDAR system 100 may determine the distance to a selected object based on the time delay between the emission of a light pulse and the reception of a corresponding light pulse reflected from the selected object. This time delay, which may also be referred to as the "time-of-flight" or the round-trip time of the light pulse, may be multiplied by the speed of light to determine the distance between the LIDAR system 100 and the selected object. Distance information of a number of points associated with the selected object may be used to determine the location, size, shape, pose, and motion of the selected object. The LIDAR system 100 may scan its surrounding environment and use distance information to generate a map of the environment. In some implementations, the LIDAR system 100 may be used to control an autonomous or semi-autonomous vehicle, for example, so that the autonomous or semi-autonomous vehicle can navigate the environment to reach a destination while avoiding obstacles.

The LIDAR system 100 is shown to include a transmitter 110, a receiver 120, and a LIDAR controller 130. In some implementations, the transmitter 110 and the receiver 120 may form (or be associated with) a LIDAR device 101. The transmitter 110 may include a transmit controller 111, a number of light emitters 112, and a transmit aperture 113. The light emitters 112 may emit one or more light pulses 125 that can be used to detect objects in a surrounding environment. The light emitters 112 may include any number of suitable light sources such as (but not limited to) laser diodes, light emitting diodes (LEDs), vertical cavity surface emitting lasers (VCSELs), organic light emitting diodes (OLEDs), polymer light emitting diodes (PLEDs), light emitting polymers (LEPs), liquid crystal displays (LCDs), microelectromechanical systems (MEMS), or any other device configured to selectively transmit or emit light pulses 125 at a source wavelength. The source wavelength may include, for example, the ultraviolet, visible, and/or infrared portions of the electromagnetic spectrum. In some aspects, the light emitters 112 may be disposed on one or more substrates (such as printed circuit boards (PCB), flexible PCBs, and the like). Although the light emitters 112 are described herein as emitting light pulses 115, one of ordinary skill in the art will readily understand that the light emitters 112 may transmit or emit light signals, light beams, photons, and the like. Thus, the terms light pulses, light signals, light beams, and photons may be used interchangeably herein.

The transmit aperture 113 is coupled to the light emitters 112, and may include any suitable components (such as mirrors, lenses, diffraction gratings, exit apertures, and the like) that can focus, direct, and/or condition the light pulses 115 for emission into the surrounding environment. In some implementations, the transmit aperture 113 may be configured to steer the light pulses 115 in one or more specified directions relative to the LIDAR device 101. The specified directions may span a range of directions, for example, so that distances between the LIDAR device 101 and a number of objects (such as cars, people, roads, traffic signals, traffic signs, obstacles, and so on) may be determined based on reflections of the light pulses 115 caused by the objects.

The transmit controller 111 may control operations of the light emitters 112 and the transmit aperture 113, may adjust a number of parameters or settings of the light emitters 112 and the transmit aperture 113, or both. In some implementations, the transmit controller 111 may be responsive to one or more control signals provided by the LIDAR controller 130. For example, the transmit controller 111 may adjust the pulse width of the light pulses 115 emitted by the light emitters 112 based on the one or more control signals. In other implementations, the transmit controller 111 may be omitted or may be included within the LIDAR controller 130.

The receiver 120 may include a number of photodetectors 121, a detector circuit 122, and an analog-to-digital converter (ADC) 123. The photodetectors 121 may receive light pulses 125 (such as photons) from the surrounding environment. The received light pulses 125 may include components of the emitted light pulses 115 reflected from one or more objects in the surrounding environment. The received light pulses 125 may also include components of light that traversed a volumetric medium. The photodetectors 121 may be configured to convert the received light pulses 125 into photodetector signals (such as analog current signals) indicative of intensity levels and/or pulse widths of the received light pulses 125. The photodetectors 121 may be any suitable component or device that can receive or sense light including, for example, photodiodes, avalanche photodiodes, Silicon Photomultipliers (SiPMs), phototransistors, cameras, active pixel sensors (APS), charge coupled devices (CCDs), cryogenic detectors, or the like. In some implementations, the photodetectors 121 may be reverse-biased photodiodes that generate a current in response to receiving light pulses, for example, such that the amount of current through each photodiode is proportional to the intensity of light pulses received by the photodiode.

Although not shown for simplicity, the receiver 120 may include optics (e.g., lenses, mirrors, diffraction gratings) configured to emit light toward/receive light from a specific direction and/or to focus such light, to filter out one or more wavelengths, bands of wavelengths, polarizations, or other specified properties of such light, or to otherwise interact with or modify such light so that the photodetectors 121 primarily receive light corresponding to the wavelength of the light pulses 115 emitted by the transmitter 110 (and receive minimal light corresponding to other wavelengths). In some implementations, optics of the LIDAR device 101 may be configured to focus and/or collimate light emitted from the transmitter 110 into one or more respective beams of light directed in respective directions into an environment of the LIDAR device 101. In addition, or in the alternative, the optics may be configured to focus light reflected from respective regions of the environment located in respective directions from the LIDAR device 101.

The detector circuit 122 may use any suitable technique to sample photodetector signals provided by the photodetectors 121 to determine intensity levels and/or one or more characteristics of the received light pulses 125. In some implementations, the detector circuit 122 may sample the photodetector signals at a number of intervals or sampling times. In other implementations, the detector circuit 122 may continuously sample the photodetector signals. The detector circuit 122 may provide the determined intensity levels and characteristics of the received light pulses 125 to the ADC 123, for example, as analog signals containing magnitude information and timing information that may be used to generate a point cloud of a surrounding environment. In some implementations, the detector circuit 122 may amplify and/or filter the photodetector signals.

The detector circuit 122 may also include a look-up table (LUT) 124 storing reference pulse width information that may be used to determine an amount of pulse elongation of the received light pulses 125. The LUT 124 may store a reference pulse width for each of a plurality of different amplitudes of light pulses. In some aspects, each of the reference pulse widths stored in the LUT 124 may be indicative of an expected pulse width of a received light pulse 125 having a corresponding amplitude. In some implementations, the detector circuit 122 may determine an amplitude of a received light pulse 125 and use the determined amplitude to retrieve a corresponding reference pulse width from the LUT 124. The detector circuit 122 may compare the determined pulse width with the retrieved reference pulse width to determine an amount of pulse elongation of the received light pulse (which may be caused by the volumetric medium).

The ADC 123 may receive analog signals indicating intensity levels and/or characteristics of the received light pulses 125 from the detector circuit 122, and may convert the analog signals into digital data that can be processed by the LIDAR controller 130. The ADC 123 may be any suitable ADC such as (but not limited to) a flash ADC, a successive-approximation-register (SAR) ADC, or a delta-sigma ADC. In some implementations, each photodetector 121 may correspond to a respective ADC. In other implementations, a plurality of photodetectors 121 may correspond to a single ADC (such as to reduce the size, cost, and/or power consumption of the LIDAR device 101). In some other implementations, the ADC 123 may be omitted.

The LIDAR controller 130, which may be any suitable computing device or system, may include a processor 131, a memory 132, and a digital signal processor (DSP) 133. The DSP 133 may process digital data provided by the ADC 123 to determine intensity information, range information, and pulse elongation information of light pulses received by any number of the photodetectors 121. The determined intensity, range, and/or pulse elongation information may be used to determine the size, shape, location, movement, and orientation of a number of detected objects in the surrounding environment. In some implementations, the DSP 133 may receive information indicative of the amount of pulse elongation of the received light pulse 125 (which may be caused by the volumetric medium), and may use the indicated amount of pulse elongation to classify the detected objects as either objects to be avoided (such as by an autonomous or semi-autonomous vehicle) or as air particulates associated with the volumetric medium.

The processor 131 may be any suitable one or more processors capable of executing scripts or instructions of one or more software programs stored in the LIDAR system 100 (e.g., within the memory 132). In some implementations, the processor 131 may include one or more microprocessors and memory providing at least a portion of machine-readable media within which program instructions or scripts can be stored. In other implementations, the processor 131 may be an Application Specific Integrated Circuit (ASIC). In some other implementations, the processor 131 may be or include one or more Field Programmable Gate Arrays (FPGAs) or Programmable Logic Devices (PLDs).

The memory 132 may store information pertaining to the transmitter 110, the receiver 120, the surrounding environment, or any combination thereof. The memory 132 may also include a non-transitory computer-readable medium (e.g., one or more nonvolatile memory elements, such as EPROM, EEPROM, Flash memory, a hard drive, and so on) that may store a number of software programs each including instructions or scripts that, when executed by the processor 131, causes the LIDAR system 100 to perform all or a portion of the operations described with respect to FIGS. 7A-7B and 8A-8C. In some implementations, the memory 132 may also store reference pulse width information that may be used to determine an amount of pulse elongation of the received light pulses 125 (which may be caused by a volumetric medium in the environment).

Figure 2A:
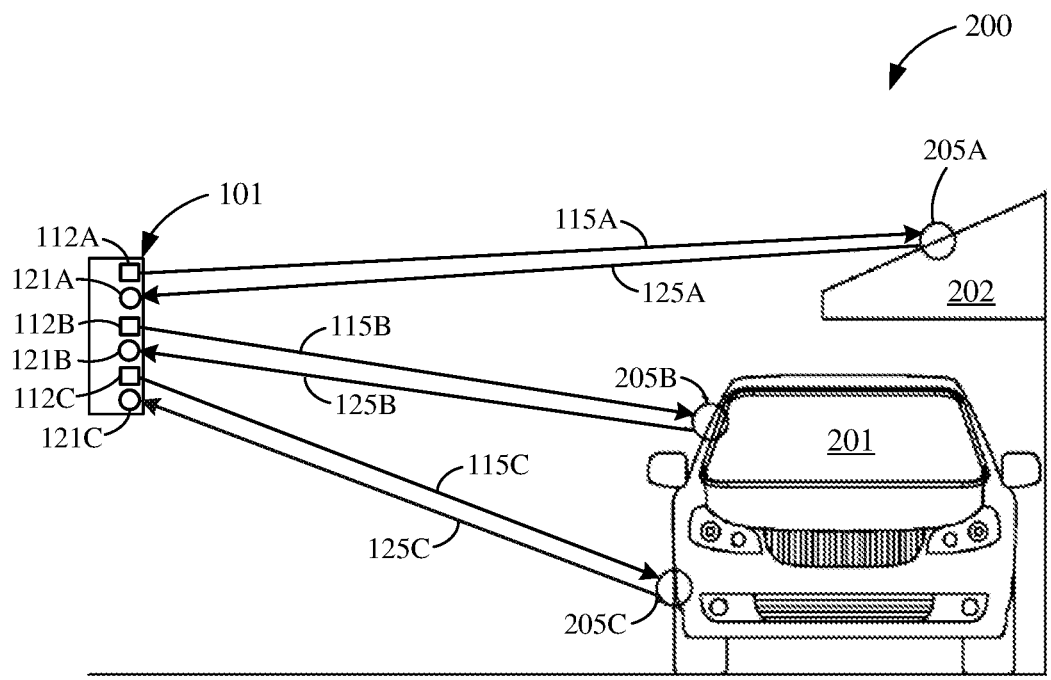
FIG. 2A shows a LIDAR device in an environment.

FIG. 2A illustrates the LIDAR device 101 in an example environment 200. The example environment 200 is shown to include an automobile 201 and an overhang 202. The LIDAR device 101, which may be attached to or otherwise associated with an autonomous or semi-autonomous vehicle (not shown for simplicity), is shown to include three light emitters 112A-112C and three photodetectors 121A-121C (other components of the LIDAR device 101 are not shown for simplicity). The three light emitters 112A-112C may be configured to emit respective light pulses 115A-115C into the environment 200, and the three photodetectors 121A-121C may be configured to detect or receive respective light pulses 125A-125C reflected from objects in the environment 200. A first light pulse 115A illuminates a portion 205A of the overhang 202, and a first photodetector 121A receives a corresponding reflected light pulse 125A. A second light pulse 115B illuminates a portion 205B of the automobile 201, and a second photodetector 121B receives a corresponding reflected light pulse 125B. A third light pulse 115C illuminates another portion 205C of the automobile 201, and a third photodetector 121C receives a corresponding reflected light pulse 125C. The LIDAR system 100 may use one or more properties of the received light pulses 125A-125C (e.g., timing, amplitude, pulse width, and so on) to determine the distance between the LIDAR device 101 and each of the portions 205A-205C in the environment 200.

Figure 2B:
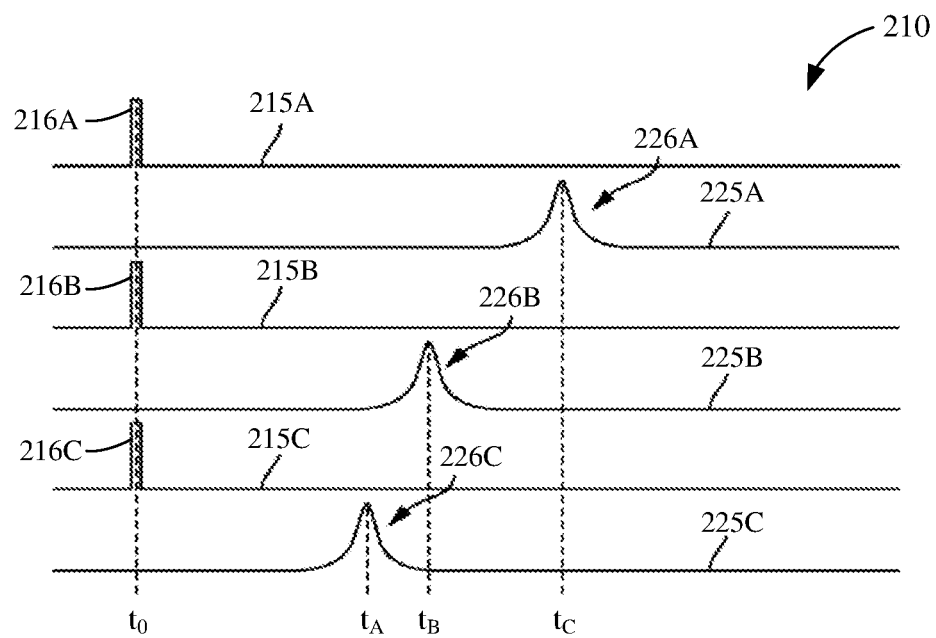
FIG. 2B shows a timing diagram of waveforms corresponding to emitted light pulses and received light pulses of a LIDAR device.

FIG. 2B shows an example timing diagram 210 of waveforms corresponding to emitted light pulses and received light pulses of a LIDAR device. Transmit waveforms 215A-215C may be indicative of intensity levels of respective light pulses 115A-115C emitted from the LIDAR device 101 of FIG. 2A, and receive waveforms 225A-225C may be indicative of intensity levels of respective light pulses 125A-125C received by the LIDAR device 101 of FIG. 2A. The light pulses 115A-115C are emitted from the LIDAR device 101 at the same time to (or at least substantially the same time), and the reflected light pulses 125A-125C are received by the LIDAR device 101 at different times $t_A$-$t_C$ (e.g., due to different distances between the LIDAR device 101 and each of the portions 205A-205C of the environment 200). The transmit waveforms 215A-215C include respective pulses 216A-216C that represent the time to at which corresponding light pulses 115A-115C are emitted from the LIDAR device 100. The receive waveforms 225A-225C include respective pulses 216A-216C that represent the times $t_A$-$t_C$ at which corresponding reflected light pulses 125A-125C are received by the LIDAR device 101. The reception times $t_A$-$t_C$ may be determined from respective pulses 226A-226C using any suitable peak detection technique (e.g., determining a peak amplitude, determining a centroid, determining a mean time between threshold crossings, and the like). The determined reception times $t_A$-$t_C$ may be used to determine distances between the LIDAR device 101 and respective portions 205A-205C of the environment 200.

It is important for a LIDAR system to distinguish between obstacles to be avoided by an autonomous vehicle and a volumetric medium of air particulates through which the autonomous vehicle may traverse. Some non-limiting examples of obstacles to be avoided by the autonomous vehicle may include cars, trucks, cyclists, pedestrians, fallen trees, and the like, and some non-limiting examples of air particulates through which the autonomous vehicle may traverse may include exhaust, aerosol, dust, pollution, smoke, rain, fog, and the like. A LIDAR system may detect objects in a surrounding environment by emitting (or transmitting) a plurality of light pulses into the environment, receiving return light pulses reflected by objects in the environment, and generating a point cloud (or some other suitable map of points) indicating the locations, movements, orientations, features, and other characteristics of the detected objects. In some implementations, the point cloud may include a collection of depth-map points or pixels each representing a distance between a LIDAR device and a corresponding point or portion of an object from which an emitted light pulse was reflected and received as a return light pulse by the LIDAR device. The collection of depth-map points that form the point cloud may be analyzed (or otherwise processed) to detect a presence of objects in the environment, to determine distances between the LIDAR device and the detected objects, to determine movement of the detected objects, to determine a number of features of the detected objects, to assist in the operation of autonomous vehicles, or any combination thereof. Because the autonomous vehicle may use one or more of these point clouds to navigate through the environment without human input, the accuracy with which the LIDAR system can detect the objects and determine their locations, movements, orientations, features, and other characteristics may be critical for the safe, comfortable, or otherwise desirable operation of an autonomous vehicle.

In accordance with various aspects of the present disclosure, the accuracy with which a LIDAR system may determine the location, movement, orientation, features, and other characteristics of a detected object may be increased by distinguishing between light pulses reflected by an inclined surface (such as a road or street) and light pulses reflected by air particulates associated with a volumetric medium. As mentioned above, the amount of pulse elongation of reflected or return light pulses relative to their corresponding emitted light pulses may be used to determine the features and characteristics of objects detected by the LIDAR device. More specifically, while the shape of a light pulse reflected from a surface that is orthogonal to the direction of a corresponding light pulse emitted from a LIDAR device may be the same as (or at least similar to) the shape of the corresponding emitted light pulse, the shape of a light pulse reflected from a surface that is inclined relative to the direction of a corresponding light pulse emitted by the LIDAR device may be different than (such as elongated as compared to) the shape of the corresponding emitted light pulse.

Figure 3A:
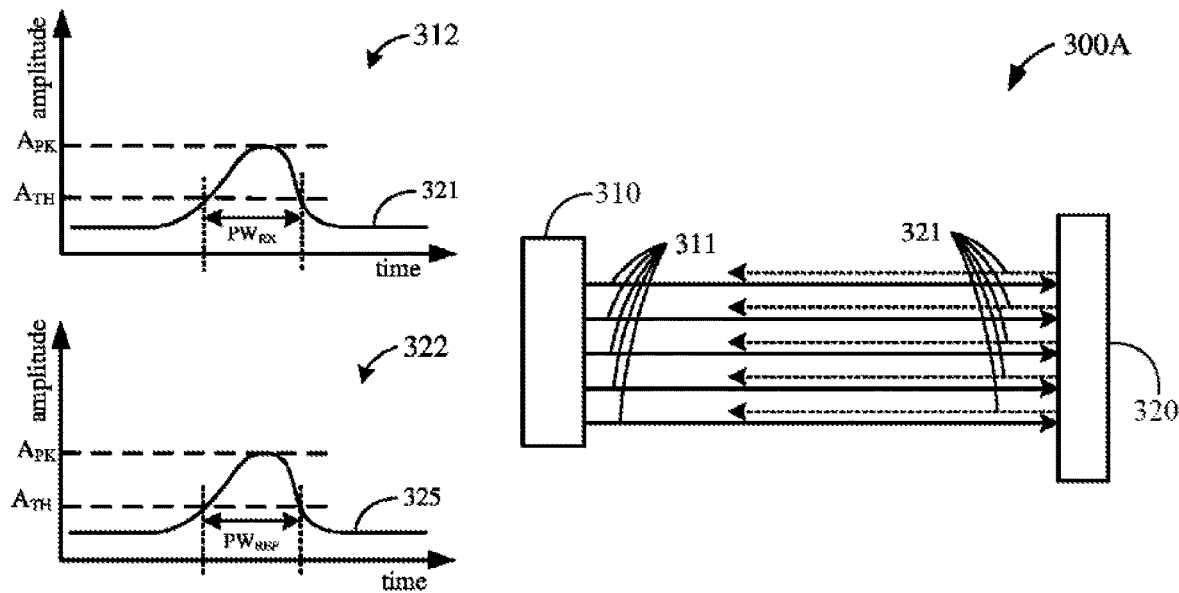
FIG. 3A shows an illustration depicting light pulses reflected by an orthogonal surface.

FIG. 3A shows an illustration 300A depicting light pulses reflected by a reflective surface 320. As shown, light pulses 311 emitted from a LIDAR device 310 are reflected by the reflective surface 320 as return light pulses 321 and received by the LIDAR device 310. The reflective surface 320 is orthogonal to the direction of the emitted light pulses 311 such that the angle of incidence of the emitted light pulses 311 is the same (or at least substantially the same) as the angle of reflection of the return light pulses 321. As a result, the shapes of the return light pulses 321 are the same (or substantially the same) as the shapes of the corresponding emitted light pulses 311. In some implementations, the shape of a light pulse may be described using its rising edge timing, falling edge timing, peak amplitude, pulse width, or any combination thereof.

A first illustrative graph 312 depicts the shape of a return light pulse 321 received by the LIDAR device 310, and a second illustrative graph 322 depicts the shape of a reference light pulse 325. In some implementations, the pulse width ($PW_{RX}$) of the received light pulse 321 may refer to a period of time during which the amplitude of the received light pulse 321 exceeds a threshold value $A_{TH}$, and the pulse width ($PW_{RX}$) of the reference light pulse 325 may refer to a period of time during which the amplitude of the reference light pulse 325 exceeds the threshold value $A_{TH}$. As shown, the pulse width ($PW_{RX}$) of the received light pulse 321 is the same (or at least substantially the same) as the reference pulse width ($PW_{REF}$), which may indicate that the received light pulses 321 exhibit little (if any) pulse elongation relative to the corresponding emitted light pulses 311.

In some implementations, the LIDAR device 310 may sample portions of a respective light pulse corresponding to periods of time during which the amplitude of the respective light pulse exceeds a threshold value, and may store (at least temporarily) the sampled portions of the respective light pulse. In some aspects, the LIDAR device 310 may trigger or enable sampling of the respective light pulse when its amplitude rises above a first threshold value, and may terminate or disable the sampling of the respective light pulse when its amplitude falls below a second threshold value. The first and second threshold values may be any suitable values that allow the LIDAR device 310 to reduce the amount of data to be analyzed or processed by an associated controller or computing device (such as the LIDAR controller 130 of FIG. 1) without reducing accuracy by more than a certain amount. In some aspects, the first and second threshold values may be the same. In other aspects, the first and second threshold values may be different. In other implementations, the LIDAR device 310 may continuously sample the respective light pulse and store (at least temporarily) the entirety of the sampled light pulse.

Figure 3B:
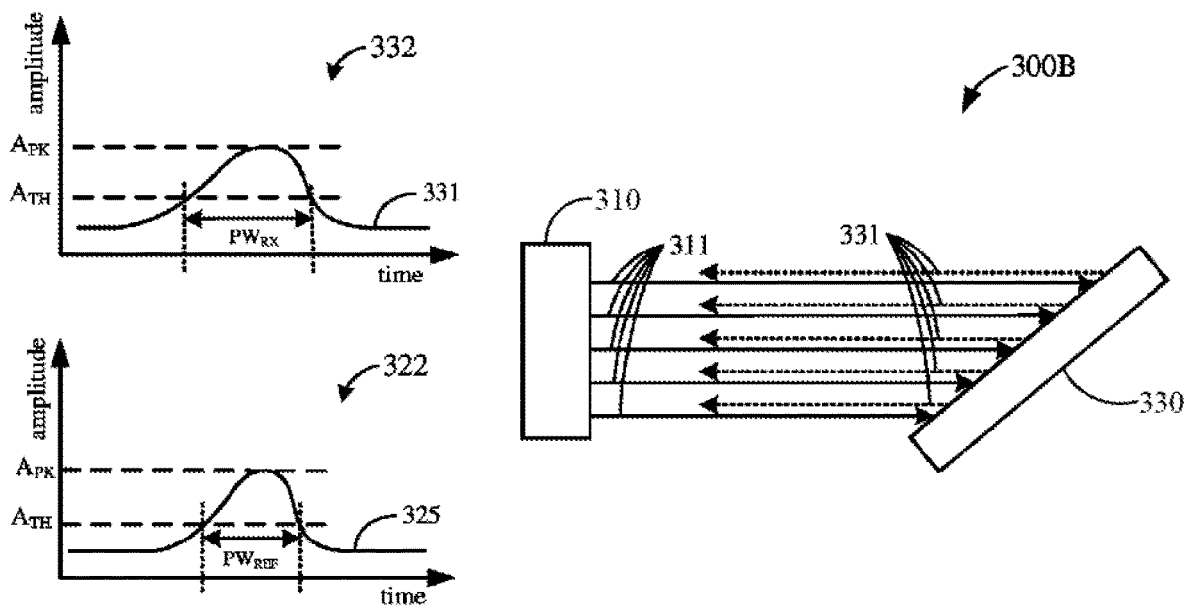
FIG. 3B shows an illustration depicting light pulses reflected by an inclined surface.

FIG. 3B shows an illustration 300B depicting light pulses reflected by another reflective surface 330. As shown, light pulses 311 emitted from the LIDAR device 310 are reflected by the reflective surface 330 as return light pulses 331 and received by the LIDAR device 310. The reflective surface 330 is inclined relative to the direction of the emitted light pulses 311 such that the angle of incidence of the emitted light pulses 311 is different than the angle of reflection of the return light pulses 331. For example, when the emitted light pulses 311 hit the inclined surface 330, some photons associated with the light pulses 311 may arrive at and be reflected from the reflective surface 330 before other photons associated with the emitted light pulses 311, thereby spreading the reflected light pulses 331 in time such that the shapes of the return light pulses 331 are elongated relative to the shapes of the emitted light pulses 311. As a result, the pulse width of a respective return light pulse 331 may be longer than (such as elongated as compared to) the pulse width of the corresponding emitted light pulse 311).

A first illustrative graph 332 depicts the shape of a return light pulse 331 received by the LIDAR device 310, and the second illustrative graph 322 depicts the shape of the reference light pulse 325. As shown, the pulse width ($PW_{RX}$) of the received light pulse 331 is longer than the reference pulse width ($PW_{REF}$), which may indicate that the received light pulse 331 exhibits a detectable amount of pulse elongation relative to the corresponding emitted light pulse 311. The amount of pulse elongation of the return light pulse 331 relative to the corresponding emitted light pulse 311 may be indicative of one or more features or characteristics of the inclined surface 330 (or other objects that reflect emitted light pulses as return light pulses that can be detected by the LIDAR device 310).

Pulse elongation may be caused by other environmental features. For one example, light pulses reflected by multiple surfaces of the same object may experience pulse elongation. More specifically, first portions of a light pulse may be reflected from an edge of a first surface of an object, while second portions of the light pulse may be reflected from a second surface of the object that is a different distance from the LIDAR device than the first surface. The first and second reflected portions of the light pulse may combine or overlap with each other to form a composite light pulse having a larger amplitude than either of the first and second reflected portions individually. In some aspects, the composite light pulse may include first and second peaks corresponding to the first and second reflected portions of the light pulse, respectively. The composite light pulse, which may be associated with or cause a mixed pixel effect, may be incorrectly interpreted as indicating a presence of two objects in the environment (such as rather than indicating one object having first and second surfaces).

For another example, pulse elongation may be caused by a presence of a volumetric medium in the environment. More specifically, when a light pulse encounters a volumetric medium, photons may be reflected as the light pulse interacts with small air particulates that form the volumetric medium. These air particulates may cause returns such that the pulse width of the return light pulse is longer than the pulse width of the corresponding emitted light pulse. As a result, pulse elongation caused by air particulates or other aspects of a volumetric medium may reduce the accuracy with which a LIDAR system can detect, identify, locate, and classify reflective surfaces in the surrounding environment, for example, because light pulses reflected from such air particulates may be incorrectly interpreted to indicate the presence of objects or obstacles to be avoided by autonomous vehicles (rather than interpreted to indicate the presence of a volumetric medium through which autonomous vehicles may traverse).

Figure 3C:
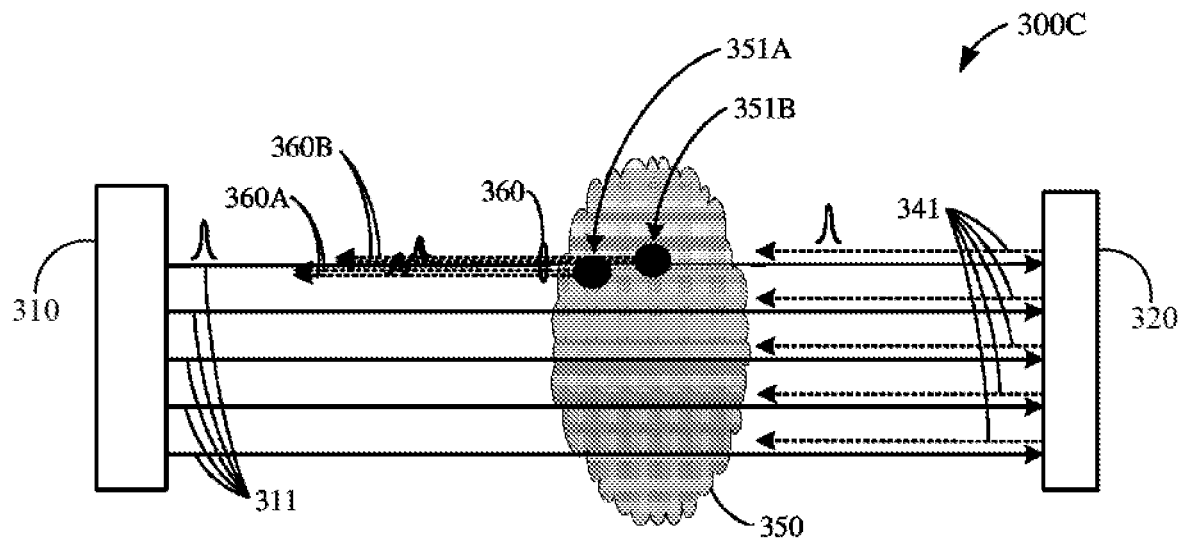
FIG. 3C shows an illustration depicting light pulses reflected in an environment containing a volumetric medium.

FIG. 3C shows an illustration 300C depicting light pulses reflected in an environment containing a volumetric medium 350. Some portions of the emitted light pulses 311 may be reflected by the reflective surface 320 as first return light pulses 341, and other portions of the emitted light pulses 311 may be reflected by air particulates 351A and 351B within the volumetric medium 350 as second return light pulses 360. For the example of FIG. 3C, the second return light pulses 360 may include or refer to one or more light pulses 360A reflected by the first air particulate(s) 351A, and may include or refer to one or more light pulses 360B reflected by the second air particulate(s) 351B. It is noted that the dashed lines referring to the one or more light pulses 360A and the dashed lines referring to the one or more light pulses 360B are separated from the solid line referring to the corresponding emitted light pulse 311 in the depiction of FIG. 3C for illustrative purposes only. In implementations, the direction of travel of the one or more light pulses 360A and the direction of travel of the one or more light pulses 360B are opposite of, yet collinear with, the direction of travel of the corresponding emitted light pulse 311 (e.g., the angle of arrival of the light pulses 360A and 360B may be the same as the angle of departure of the corresponding emitted light pulse 311). As used herein, the term "air particulates 351" may collectively refer to air particulates 351A and air particulates 351B, and the term "light pulses 360" may collectively refer to light pulses 360A and light pulses 360B. Although only two air particulates 351A and 351B are shown in FIG. 3C for simplicity, it is to be understood that the volumetric medium 350 may include additional air particulates from which the LIDAR device 310 may receive additional return light pulses 360.

The first return light pulses 341 may pass through the volumetric medium 350 and be reflected by reflective surface 320. The second return light pulses 360 may be reflections of photons by the small air particulates that form the volumetric medium 350, and may be relatively weak light pulses as compared to the emitted light pulses 311 and the first return light pulses 341. Although the relatively weak return light pulses 360 may not be individually detected by the LIDAR device 310 (such as because their peak amplitudes are less than a threshold value), a plurality of the relatively weak light pulses 360 may combine and/or constructively interfere with each other in a manner that results in a relatively strong "composite" light pulse that can be detected by the LIDAR device 310.

Figure 3D:
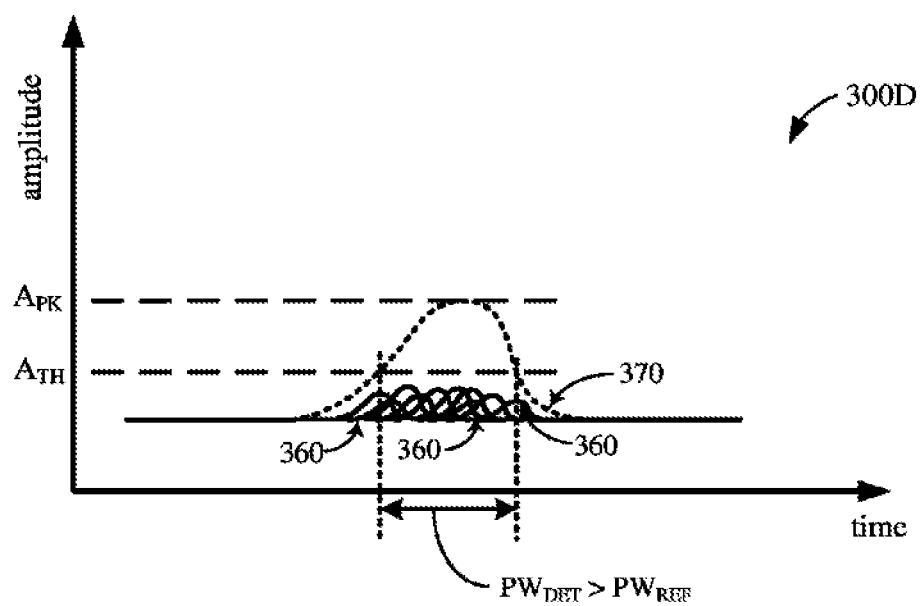
FIG. 3D shows a graph depicting a light pulse including a number of individual reflected light pulses.

FIG. 3D shows a graph 300D depicting a relatively strong composite light pulse 370 and a number of relatively weak light pulses 360. The relatively weak light pulses 360 may be examples of the return light pulses 360 of FIG. 3C. In some implementations, the relatively strong composite light pulse 370 may include or represent the number of relatively weak light pulses 360, and each of the relatively weak light pulses 360 may correspond to a portion of an emitted light pulse reflected from air particulates within the volumetric medium 350. The relatively strong composite light pulse 370 is depicted as having a detected pulse width ($PW_{DET}$) corresponding to a period of time during which the amplitude of the light pulse 370 exceeds the threshold value $A_{TH}$. Referring also to FIG. 3C, the relatively strong composite light pulse 370 is elongated relative to the light pulses 311 emitted from the LIDAR device 310 and may also be elongated relative to the return light pulses 341 from the reflective surface 320, for example, such that the pulse width ($PW_{DET}$) of the relatively strong composite light pulse 370 is longer than the reference pulse width ($PW_{REF}$).

The relatively weak light pulses 360 are depicted in FIG. 3D as having amplitudes that do not exceed the threshold value $A_{TH}$, and may not be individually detectable by the LIDAR device 310. The relatively strong composite light pulse 370 is depicted as having an amplitude that exceeds the threshold value $A_{TH}$, and may be detectable by the LIDAR device 310. The relatively strong composite light pulse 370 may be misinterpreted as a light pulse reflected from a solid object if pulse elongation was not considered, which may cause an associated controller or computing device (such as the LIDAR controller 130 of FIG. 1) to incorrectly classify the volumetric medium 350 as an object in the surrounding environment to be avoided (e.g., by an autonomous vehicle). If pulse elongation is considered, the composite light pulse 370 may be interpreted as a light pulse reflected from an inclined surface or the ground, or as a multitude of relatively weak light pulses reflected from the volumetric medium 350. In such situations, other factors may also be considered in classifying or interpreting the signal, for example, to distinguish between objects to be avoided and air particulates such as exhaust.

Figure 4A:
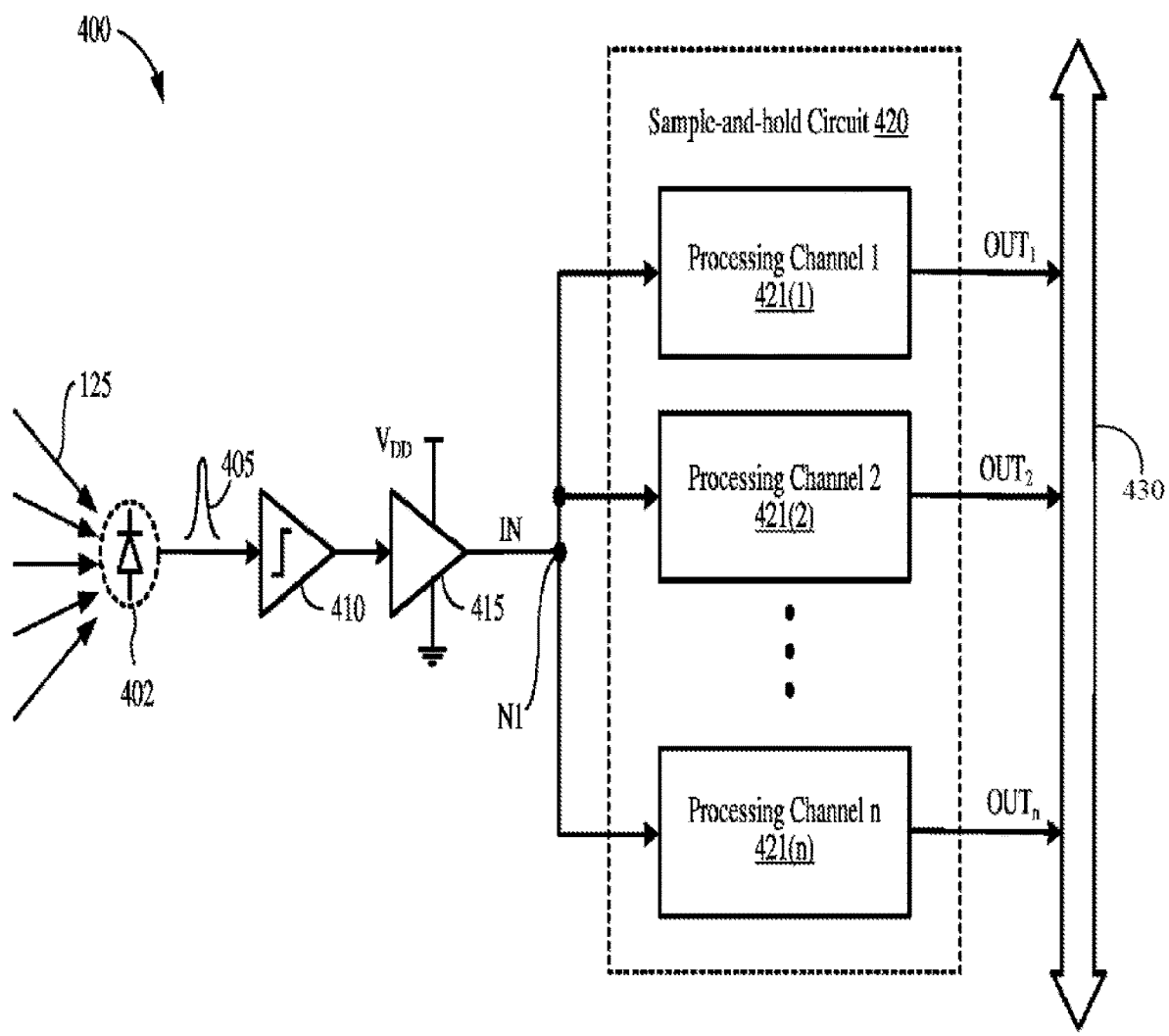
FIG. 4A shows a block diagram of an example detector circuit suitable for use in a LIDAR device.

FIG. 4A shows a block diagram of an example detector circuit 400 suitable for use in a LIDAR device (such as the LIDAR device 101 of FIG. 1). In some implementations, the detector circuit 400 may be one example of the detector circuit 122 of FIG. 1. The detector circuit 400 is shown to include a comparator 410, an amplifier 415, a sample-and-hold circuit 420, and an output bus 430. For the example of FIG. 4A, a photodiode 402 generates a photodetector signal 405 in response to receiving or detecting photons associated with received light pulses 125. The photodetector signal 405 may include information indicative of at least the rising edge timing, the falling edge timing, the peak amplitude, and the pulse width of a respective return light pulse 125. In some implementations, the amount of current generated by the photodiode 402 may be indicative of the intensity of photons detected by the photodiode 402, and the shape of the signal waveform of the photodetector signal 405 may be indicative of timing and pulse width information of the respective return light pulse 125. Although the photodetector signal 405 is generated by the photodiode 402 in the example of FIG. 4A, other suitable circuits or devices may be used to detect photons associated with the return light pulses 125 and to generate electrical signals indicative of signal properties and timing information of the return light pulses 125.

The comparator 410 includes an input coupled to the photodiode 402, includes an output coupled to the amplifier 415, and may compare the amplitude of the photodetector signal 405 with the threshold value ($A_{TH}$) to determine whether the corresponding light pulse is a valid signal to be sampled by the sample-and-hold circuit 420. In some implementations, the comparator 410 may be configured to selectively pass the photodetector signal 405 to the sample-and-hold circuit 420 based on the comparison. For example, the comparator 410 may pass the photodetector signal 405 to the sample-and-hold circuit 420 for sampling when its amplitude exceeds the threshold value $A_{TH}$, and may not pass the photodetector signal 405 to the sample-and-hold circuit 420 for sampling when its amplitude does not exceed the threshold value $A_{TH}$. In other implementations, the comparator 410 may be configured to selectively trigger or enable the sample-and-hold circuit 420 based on the comparison. For example, the sample-and-hold circuit 420 may be enabled to sample the photodetector signal 405 when its amplitude exceeds the threshold value $A_{TH}$, and may not be enabled to sample the photodetector signal 405 when its amplitude does not exceed the threshold value $A_{TH}$. In this manner, the comparator 410 may reduce the amount of information or data to be sampled, stored, and processed to generate point clouds of the surrounding environment, for example, by ignoring received signals having an amplitude less than the threshold value $A_{TH}$.

In some implementations, the comparator 410 may include hysteresis to prevent chattering and inadvertent logic state transitions caused by spikes in the input signals. In some aspects, the comparator 410 may be enabled when a magnitude of the photodetector signal 405 exceeds a first threshold level and may be disabled when the magnitude of the photodetector signal 405 falls below a second threshold level that is less than the first threshold level. In this manner, the comparator 410 may not only ignore spurious spikes in the input signal but also may determine a walk error associated with the received light pulses 125. In addition, or in the alternative, the first and second threshold levels may be dynamically adjusted based on reception of a number of return light pulses 125, for example, to improve the accuracy with which the comparator 410 identifies valid light pulses to be processed by the detector circuit 400.

In other implementations, the comparator 410 may be omitted, or may be modified to allow photodetector signals 405 to be continuously sampled by the sample-and-hold circuit 420.

The amplifier 415 is coupled between the comparator 410 and an input node N1 of the sample-and-hold circuit 420. The amplifier 415 may be any suitable circuit (such as a low-noise amplifier) that amplifies the photodetector signal 405 to generate an input signal (IN) suitable for driving circuitry within or associated with the sample-and-hold circuit 420. In some implementations, the amplifier 415 may convert a photocurrent generated by the photodiode 402 into an analog voltage signal indicative of signal properties and timing information of a respective return light pulse 125. More specifically, in some aspects, the amplifier 415 may be a transimpedance amplifier that converts a received photocurrent into a voltage signal. It is noted that although the amplifier 415 is shown to include power terminals coupled to $V_{DD}$ and ground, in other implementations, the power terminals of the amplifier 415 may be coupled to other suitable voltage supplies or voltage rails.

The sample-and-hold circuit 420 is coupled between node N1 and the output bus 430, and may sample the photodetector signal 405 to determine intensity and timing information of the received light pulses 125 at different times. The sample-and-hold circuit 420 may provide a number of output signals ($OUT_1$-$OUT_n$) indicative of determined intensity and timing information of a corresponding number of photodetector signals 405 to the output bus 430. In some implementations, the sample-and-hold circuit 420 may operate in a sample to sample the photodetector signal 405 to determine intensity and timing information, and may operate in a hold mode to hold or store the sampled signals for analysis and/or conversion to digital data that can be processed by the LIDAR controller 130 of FIG. 1.

The sample-and-hold circuit 420 may include a number of processing channels 421(1)-421(n) coupled in parallel with each other between node N1 and the output bus 430. In some implementations, the processing channels 421(1)-421(n) may independently sample the photodetector signal 405 (such as in a sequential manner) to determine intensity and timing information of a corresponding one of the received light pulses 125, and may generate the output signals $OUT_1$-$OUT_n$ indicative of the intensity and timing information of the sampled photodetector signals 405. For purposes of discussion herein, the intensity information may include (but is not limited to) intensity levels, pulse shape, and the peak amplitude of a received light pulse 125, and the timing information may include (but is not limited to) rising edge timing, falling edge timing, and pulse width information of the received light pulse 125. In some aspects, the sample-and-hold circuit 420 may include 64 processing channels 421(1)-421(64). In other aspects, the sample-and-hold circuit 420 may include any suitable number of processing channels 421.

In some implementations, one or more of the processing channels 421(1)-421(n) may be configured to determine a pulse width of a received light pulse reflected from a surface, to compare the determined pulse width with a selected one of a number of reference pulse widths, and to determine an amount of pulse elongation of the received light pulse (which may be caused by the volumetric medium) based on the comparison. The determined amount of pulse elongation may be used (such as by the LIDAR controller 130 of FIG. 1) to distinguish between light pulses reflected an inclined surface of an object and light pulses reflected by air particulates associated with a volumetric medium and/or to classify a reflective surface as either an object to be avoided by an autonomous vehicle or as air particulates associated with the volumetric medium. In addition, or in the alternative, the determined amount of pulse elongation may be used (such as by the LIDAR controller 130 of FIG. 1) to distinguish between light pulses reflected by debris and other small foreign objects on a road and light pulses reflected by the road. Information indicative of such distinctions and/or indicative of the determined amounts of pulse elongation may be used to identify such debris and other small foreign objects left on the road surface, which in turn may increase the accuracy with which point clouds or 3D maps generated by a LIDAR system represent objects, surfaces, and other features of the surrounding environment.

The output signals $OUT_1$-$OUT_n$ may be provided to the output bus 430, converted to digital data by one or more ADCs (not shown for simplicity), and provided to one or more digital circuits or computing devices (such as the DSP 133 and/or the processor 131 of FIG. 1) for processing and analyzing. The output signals $OUT_1$-$OUT_n$ may contain information indicative of timing and intensity values of received light pulses, indicative of determined amounts of pulse elongation, indicative of classifications of objects and surfaces in the environment, or any combination thereof. In some implementations, one or more computing devices (such as the DSP 133 and/or the processor 131) may process and analyze the digital data to detect objects in the surrounding environment, to determine distances to the detected objects, to determine various features (such as the size, shape, orientation, and movement) of the detected objects, to generate a 3D point cloud or map of the surrounding environment, and other suitable operations.

Figure 4B:
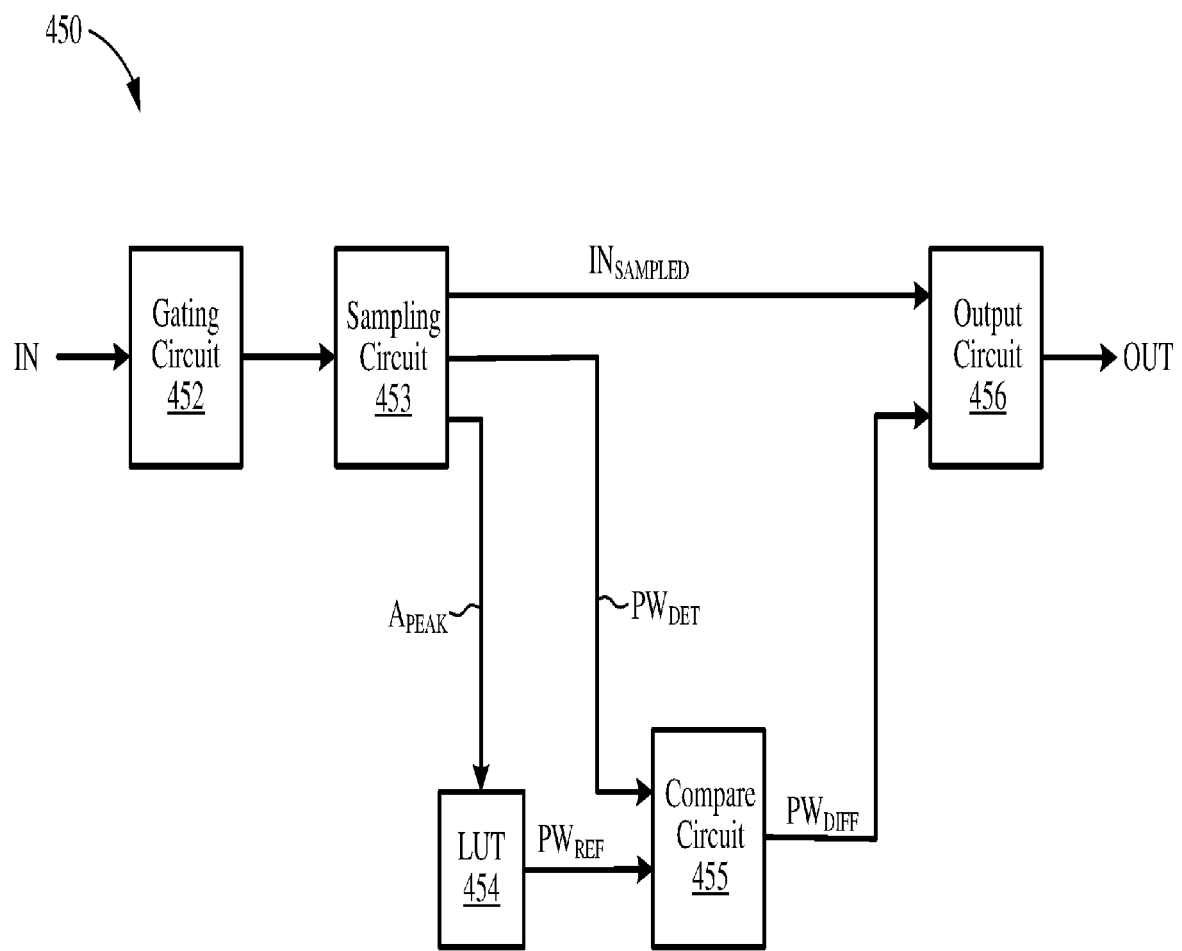
FIG. 4B shows a block diagram of an example processing channel suitable for use in a LIDAR detector or a LIDAR device.

FIG. 4B shows a block diagram of an example processing channel 450 suitable for use in a LIDAR detector or a LIDAR device (such as the LIDAR device 101 of FIG. 1). In some implementations, the processing channel 450 may be one example of the processing channels 421(1)-421(n) of FIG. 4A. The processing channel 450 may include a gating circuit 452, a sampling circuit 453, a look-up table (LUT) 454, a compare circuit 455, and an output circuit 456. In other implementations, the processing channel 450 may include one or more other suitable circuits or devices not shown in FIG. 4B.

The gating circuit 452 includes an input to receive the input signal (IN) from the amplifier 415 via node N1, and includes an output coupled to the sampling circuit 453. In some implementations, the gating circuit 452 may selectively connect (and disconnect) the processing channel 450 to node N1, for example, to control when (and for how long) the photodetector signal 405 is provided to the processing channel 450 for sampling. In some aspects, the gating circuit 452 may selectively route the photodetector signal 405 to the processing channel 450 based on one or more mode signals (not shown for simplicity), for example, so that the processing channels 421(1)-421(n) of FIG. 4A may sequentially sample the photodetector signal 405 to determine various signal properties and timing information of the return light pulses 125.

The sampling circuit 453, which may be any suitable circuit that can sample one or more values of an electrical signal, is shown to include an input coupled to the gating circuit 452, and to include one or more outputs coupled to the LUT 454, the compare circuit 455, and the output circuit 456. The sampling circuit 453 may sample the photodetector signal 405 to determine signal properties and timing information of return light pulses 125 at different times, and may generate a number of output signals indicative of the determined signal properties and timing information. In some implementations, the sampling circuit 453 may provide a first signal indicative of the peak amplitude ($A_{PEAK}$) of the received light pulse 125 to the LUT 454, may provide a second signal indicative of a determined pulse width ($PW_{DET}$) of the received light pulse to the compare circuit 455, and may provide a third signal indicative of the sampled light pulse ($IN_{SAMPLED}$) to the output circuit 456.

In some implementations, the sampling circuit 453 may determine the rising edge timing, the falling edge timing, the peak amplitude, and the pulse width of the received light pulse 125 based on the sampled photodetector signal 405. In some aspects, the sampling circuit 453 may determine a first time at which the amplitude of the received light pulse 125 rises above the threshold value ($A_{TH}$), may determine a second time at which the amplitude of the received light pulse 125 falls below the threshold value ($A_{TH}$), and may determine the pulse width ($PW_{DET}$) of the received light pulse 125 based on a difference between the first and second times. In addition, or in the alternative, the sampling circuit 453 may use one or more of the determined rising edge timing, the determined falling edge timing, and the determined peak amplitude to determine the pulse width ($PW_{DET}$) of the received light pulse 125.

The LUT 454, which may be any suitable memory circuit or device, may store a reference pulse width ($PW_{REF}$) for each of a plurality of amplitude values of the return light pulses 125. In some implementations, the determined peak amplitude ($A_{PEAK}$) provided by the sampling circuit 453 may be used as a look-up value or search key to retrieve a selected one of the plurality of reference pulse widths stored in the LUT 454. In response thereto, the LUT 454 may provide the selected reference pulse width as a signal $PW_{REF}$ to the compare circuit 455.

In addition, or in the alternative, the LUT 454 may store a number of pulse widths of light reflected from one or more road surfaces, and may provide one of these stored pulse widths for comparison with the pulse width of a received light pulse, for example, to distinguish between light pulses reflected by debris and other small foreign objects on a road and light pulses reflected by the road. In some aspects, the pulse widths of light reflected from the one or more road surfaces may be determined during a calibration operation. In other aspects, the pulse widths of light reflected from the one or more road surfaces may be determined or derived from one or more previously received light pulses that were classified as reflections from a particular road surface.

The compare circuit 455 includes a first input coupled to the sampling circuit 453, includes a second input coupled to the LUT 454, and includes an output coupled to the output circuit 456. In some implementations, the compare circuit 455 may be configured or instructed to compare the determined pulse width ($PW_{DET}$) provided by the sampling circuit 453 with the selected reference pulse width ($PW_{REF}$) provided by the LUT 454 to determine a pulse width difference ($PW_{DIFF}$). The pulse width difference, which may be expressed as $PW_{DIFF}=PW_{DET}-PW_{REF}$, may indicate an amount of pulse elongation attributable to a volumetric medium in the environment. In addition, or in the alternative, the compare circuit 455 may be configured or instructed to compare the determined pulse width ($PW_{DET}$) with a selected reference pulse width ($PW_{REF}$) of light reflected from a road surface to determine an amount of pulse elongation indicative of whether the received light pulse was reflected by debris on the road or was reflected by the road itself.

Although not shown for simplicity, the compare circuit 455 may include a control terminal to receive one or more enable signals that control or determine when the compare circuit 455 performs comparison operations to generate the pulse width difference signal $PW_{DIFF}$. Further, although not shown in FIG. 4B for simplicity, the compare circuit 455 may be independently trimmed to compensate for random offsets resulting from imperfections and defects inherent in semiconductor fabrication processes.

The output circuit 456 includes a first input coupled to the sampling circuit 453, a second input coupled to the compare circuit 455, and an output to generate the output signal OUT. The output circuit 456 may be configured to provide the sampled light pulse ($IN_{SAMPLED}$) and/or the amount of pulse elongation (which may be caused by the volumetric medium) to the output bus 430, for example, for conversion to digital data. Referring also to FIG. 1, one or more computing devices such as the LIDAR controller 130 may use information contained in the output signal OUT to distinguish between light pulses reflected by an object and light pulses reflected by air particulates associated with a volumetric medium. In this manner, the one or more computing devices may more accurately classify points in the environment corresponding to the volumetric medium as air particulates rather than objects to be avoided by an autonomous vehicle.

Figure 5:
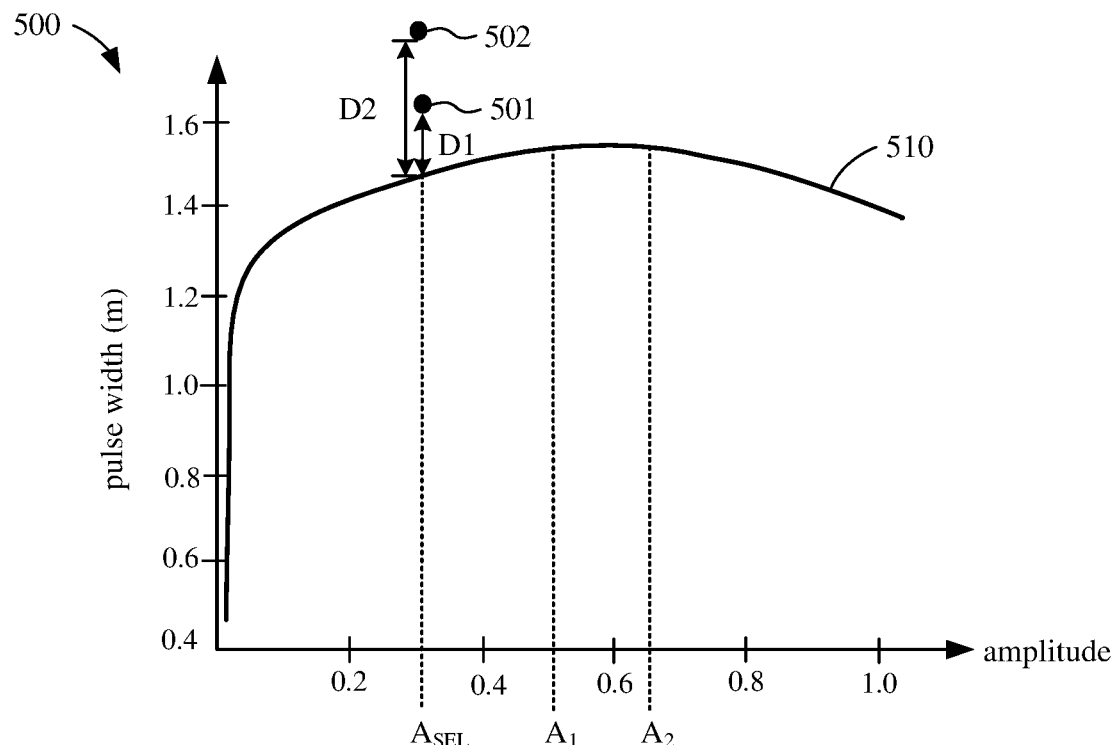
FIG. 5 shows a graph depicting the pulse widths of a number of light pulses relative to an example relationship between amplitude and pulse width of a reference light pulse.

FIG. 5 shows a graph 500 depicting the pulse widths of a number of light pulses relative to an example relationship between amplitude and pulse width of a reference light pulse. In some implementations, the light pulses depicted in FIG. 5 may be emitted or received by the LIDAR device 101 of FIG. 1 or the LIDAR device 310 of FIGS. 3A-3C. The light pulses are depicted in FIG. 5 as points 501-502 relative to an example plot 510 depicting a relationship between the pulse width (the y-axis) and the amplitude (the x-axis) of the reference light pulse. As depicted in FIG. 5, the pulse width of the reference light pulse increases as the amplitude of the reference light pulse increases until a first amplitude value $A_1$, may remain constant (at least temporarily) as the amplitude of the reference light pulse increases from the first amplitude value $A_1$ to a second amplitude value $A_2$, and then begins to decrease as the amplitude of the reference light pulse further increases.

The first and second light pulses each have a pulse width that is greater than the pulse width of the reference light pulse, for example, as depicted by points 501 and 502 positioned above the plot 510. In addition, the pulse width of the second light pulse is greater than the pulse width of the first light pulse, for example, as depicted by point 502 positioned above point 501. In some implementations, the distance D1 between point 501 and the plot 510 may be indicative of the pulse width of the first light pulse, and the distance D2 between point 502 and the plot 510 may be indicative of the pulse width of the second light pulse.

Figure 6:
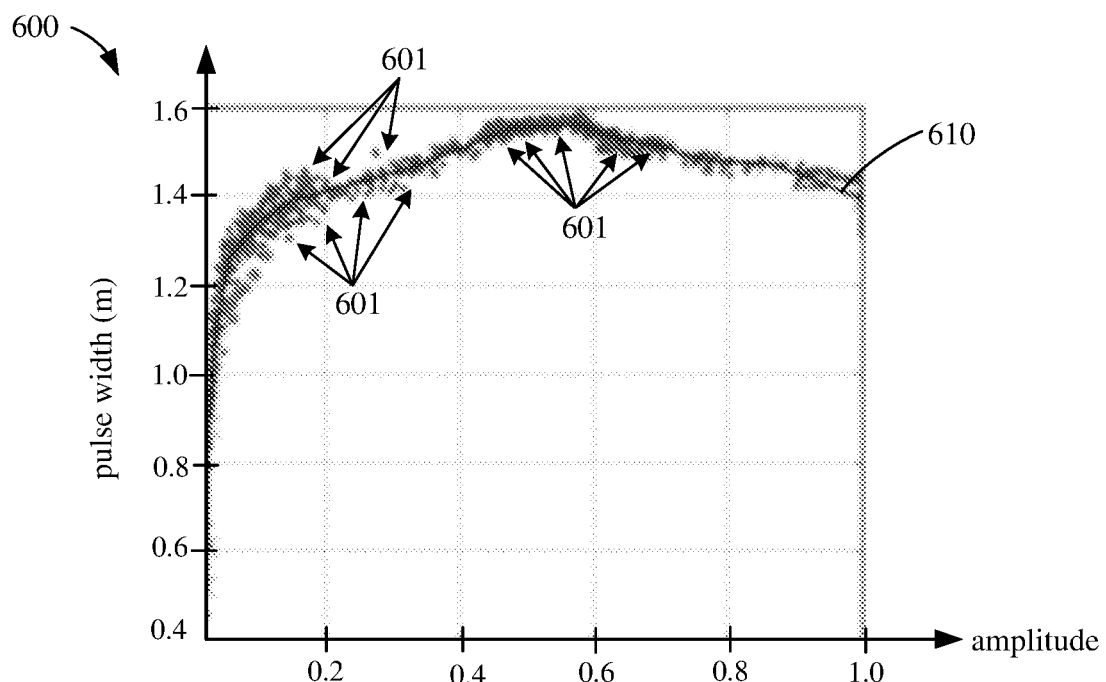
FIG. 6 shows a graph depicting an example relationship between pulse width and peak amplitude of a number of light pulses.

FIG. 6 shows a graph 600 depicting an example relationship between pulse width and peak amplitude of a number of light pulses. In some implementations, the light pulses depicted in FIG. 6 may be emitted or received by the LIDAR device 101 of FIG. 1 or the LIDAR device 310 of FIGS. 3A-3C. The light pulses are depicted in FIG. 6 as points 601 on the graph 600, with amplitude shown on the x-axis and pulse width shown on the y-axis. The graph 600 also shows an example plot 610 depicting a relationship between averaged pulse width values and averaged amplitude values of the light pulses represented by the points 601.

In some implementations, the example plot 610 depicted in FIG. 6 may be determined during manufacture of the LIDAR device. In other implementations, the example plot 610 depicted in FIG. 6 may be determined after manufacture of the LIDAR device (such as during calibration or testing of the LIDAR device). In some aspects, each of the reference pulse widths may be determined by emitting a light pulse at a corresponding power level towards an orthogonal surface, measuring the pulse width of the return light pulse reflected by the orthogonal surface, and storing the measured pulse width as the reference pulse width for a corresponding amplitude value in memory (such as in the LUT 454 of FIG. 4B). The peak amplitude may be measured by the LIDAR device and/or may be determined or otherwise derived from the transmit power level of the emitted light pulse.

Referring again to FIG. 1, the LIDAR system 100 may be coupled to, mounted on, or otherwise associated with a vehicle. The LIDAR system 100 may scan an environment by emitting light pulses into the environment and detecting return light pulses reflected by a number of objects in the environment. The emitted light pulses and the received light pulses may be time-stamped to estimate distances between the LIDAR system 100 and the detected objects, and the received light pulses may be analyzed and/or processed to determine a number of characteristics of the received light pulses. The estimated distances and determined characteristics may be used to generate a point cloud (or other suitable point mapping) indicative of objects and other reflective surfaces of the surrounding environment. As described above, aspects of the present disclosure may increase the accuracy with which point clouds classify points and represent the location, features, and other characteristics of objects detected in an environment containing a volumetric medium by distinguishing between light pulses reflected by an inclined surface and light pulses reflected by air particulates associated with the volumetric medium. In addition, or in the alternative, implementations disclosed herein may also be used to detect and identify debris and other small foreign objects left on the road surface.

In some implementations, a number of points in a point cloud of a scene may be analyzed based on pulse elongation of a number of corresponding return light pulses. For example, a point on the point cloud may be represented by a certain color that may be indicative of an amount of pulse elongation of the corresponding return light pulse, such that points corresponding to return light pulses that were reflected by fog (or other air particulates) in the scene may be visually identified and distinguished from points corresponding to return light pulses that were reflected by an inclined surface of an object (e.g., rather than the fog or other air particulates). In some aspects, points in the point cloud corresponding to light pulses having a relatively large amount of pulse elongation may be of a first color (such as red), points in the point cloud corresponding to light pulses having a nominal amount of pulse elongation may be of a second color (such as green), and points in the point cloud corresponding to light pulses having a relatively small amount of pulse elongation may be of a third color (such as blue). In other aspects, a greater number of colors (or shades of colors) may be used for the points in the point cloud, for example, to increase the granularity with which the point cloud may indicate different amounts of pulse elongation associated with the points in the point cloud. In this manner, points corresponding to return light pulses that were reflected by a volumetric medium (such as fog) may be distinguished, e.g., by their colors in this example or by other values in other implementations, from points corresponding to return light pulses that were not reflected by the volumetric medium.

Figure 7A:
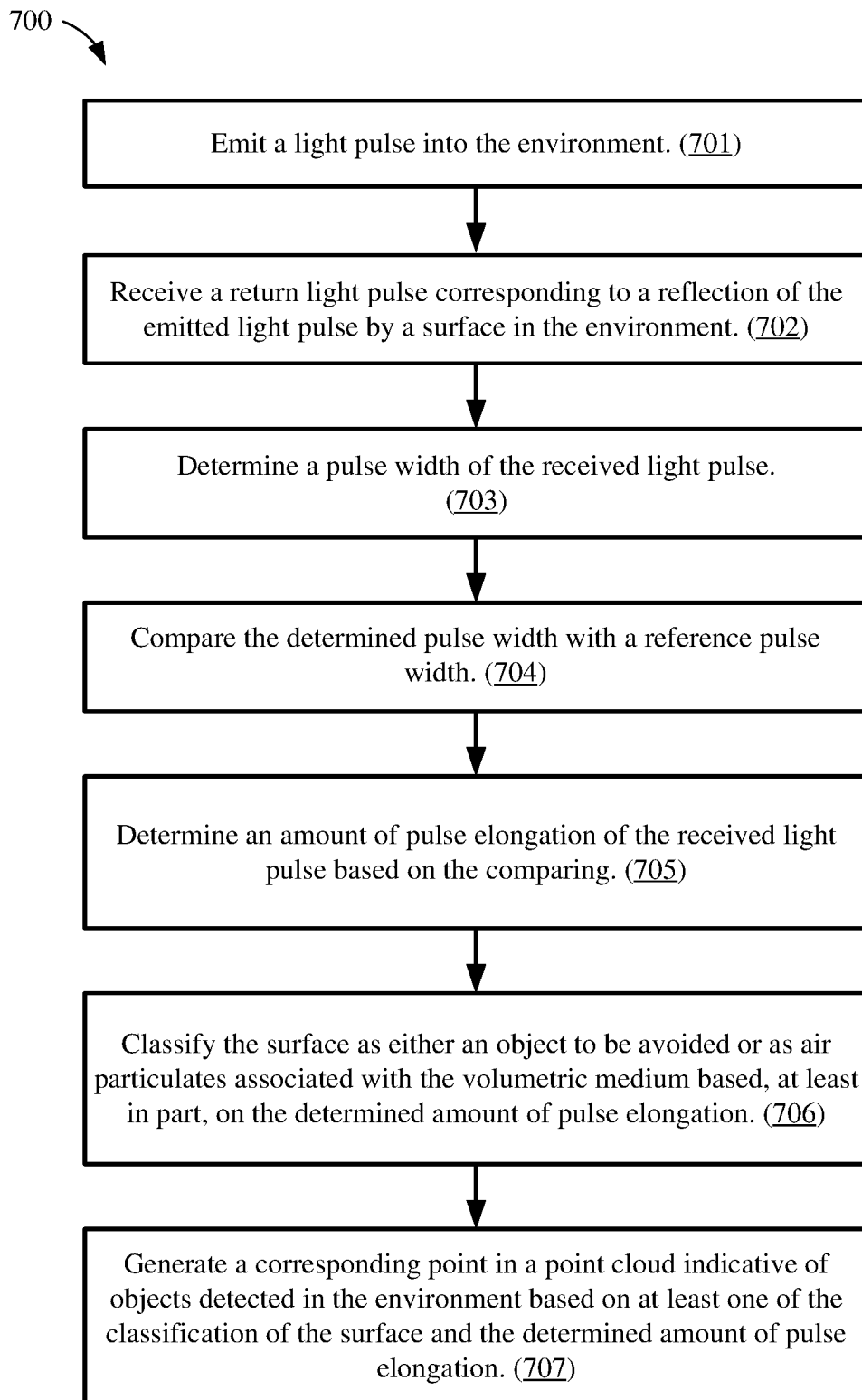
FIG. 7A shows a flow chart depicting an example operation for identifying a presence of a volumetric medium in an environment.

FIG. 7A shows a flow chart depicting an example operation 700 for identifying a presence of a volumetric medium in an environment associated with a LIDAR device. The example operation 700 is described below with respect to the LIDAR system 100 of FIG. 1 for illustrative purposes only. One of ordinary skill in the art will recognize that the example operation 700 may be performed by any suitable LIDAR system or by any suitable LIDAR device and LIDAR controller according various implementations disclosed herein. The example operation 700 may include one or more operations, functions, or actions depicted by one or more of blocks 701-707, and may be performed with additional steps, with fewer steps, with steps in a different order, with steps in parallel, or any combination thereof. Thus, although the blocks 701-707 are illustrated in a sequential order, in other implementations, these blocks 701-707 may be performed in parallel, may be performed in a different order than those described herein, may be combined into fewer blocks, divided into additional blocks, removed from the example operation 700, or any combination thereof.

The LIDAR system 100 may emit a light pulse into the environment (701), and may receive a return light pulse corresponding to a reflection of the emitted light pulse by an object in the environment (702). The received light pulse may include components of light pulses emitted from the LIDAR system 100 and reflected by one or more objects in the surrounding environment, and may also include components of reflected light pulses that propagated through a volumetric medium. In some implementations, the LIDAR system 100 may generate a photodetector signal based on detecting photons associated with the received light pulse.

The LIDAR system 100 may determine a pulse width of the received light pulse (703). In some implementations, the LIDAR system 100 may determine a first time at which a magnitude of the received light pulse rises above a first value, may determine a second time at which the magnitude of the received light pulse falls below a second value, and determine the pulse width of the received light pulse based on a difference between the first and second times. In some aspects, the first and second values may be the same. In other aspects, the first and second values may be different. In addition, or in the alternative, the LIDAR system 100 may also use one or more of a determined rising edge time, a falling edge time, and a peak amplitude to determine the pulse width of the received light pulse. In other implementations, the LIDAR system 100 may use any other suitable technique to measure, determine, or estimate the pulse width of the received light pulse.

The LIDAR system 100 may compare the determined pulse width with a reference pulse width (704). In some implementations, the LIDAR system 100 may select one of a plurality of reference pulse widths based on a peak amplitude of the received light pulse, and may use the selected reference pulse width for the comparison to generate a signal indicative of the difference between the reference pulse width and the determined pulse width. In some aspects, the plurality of reference pulse widths may be stored in a look-up table (such as the LUT 124 of FIG. 1 or the LUT 454 of FIG. 4B), and an amplitude value of the received light pulse may be used as a search key to retrieve a corresponding reference pulse width from the look-up table. In other implementations, the LIDAR system 100 may use any other suitable technique to compare the measured pulse width with the reference pulse width.

The LIDAR system 100 may determine an amount of pulse elongation of the received light pulse (705). In some implementations, the LIDAR system 100 may generate a signal indicating the difference between the reference pulse width and the determined pulse width, and use the signal to convey the amount of pulse elongation, which may be used as an indicator of the presence of a volumetric medium. In other implementations, the LIDAR system 100 may use any other suitable technique to determine the amount of pulse elongation of the received light pulse.

The LIDAR system 100 may classify the surface as either an object to be avoided (such as by an autonomous or semi-autonomous vehicle) or as air particulates associated with the volumetric medium based, at least in part, on the determined amount of pulse elongation (706). Information indicating the classification of the surface and/or the determined amount of pulse elongation may be used to increase the accuracy of mapping information (such as a point cloud) generated by the LIDAR system 100.

The LIDAR system 100 may generate a corresponding point in a point cloud indicative of objects detected in the environment based on at least one of the classification of the surface and the determined amount of pulse elongation (707). The LIDAR system 100 may use any suitable technique to generate the point cloud. In some implementations, the LIDAR system 100 may use the amplitudes, pulse widths, timing information, and other characteristics of the received light pulses along with object classification information and determined amounts of pulse elongation to generate the point cloud (or some other suitable three-dimensional map of points) indicating the location, size, shape, movement, orientation, and other features of objects and other reflective surfaces detected in the environment.

The operations associated with blocks 706 and 707 of FIG. 7A may be performed by any suitable computing device or hardware and data processing apparatus. In some implementations, operations associated with blocks 706 and 707 of FIG. 7A may be performed by the LIDAR controller 130 of FIG. 1. In other implementations, operations associated with blocks 706 and 707 of FIG. 7A may be performed by a computing device external to the LIDAR system 100 of FIG. 1. In some other implementations, operations associated with blocks 706 and 707 of FIG. 7A may be performed by a computing device remote from the LIDAR device 101 of FIG. 1. In some aspects, the remote computing device may communicate wirelessly with the LIDAR device 101 (such as by using Wi-Fi communications, BLUETOOTH communications, Wi-Gig communications, cellular communications, satellite communications, or other wireless communication protocol). In other aspects, the remote computing device may communicate with the LIDAR device 101 using any suitable wired connection (such as by using Ethernet communications, Cable communications, POTS communications, powerline communications (PLC), or other wired communication protocol).

As described above, LIDAR systems disclosed herein may use amounts of pulse elongation exhibited by reflected light pulses to identify debris and other small foreign objects (such as a piece of tire) left on a road or street surface. Although debris and other small foreign objects may be difficult to detect because of their relatively small geometrical aspects, the elongation of light pulses reflected by such debris and other small foreign objects may be detectably different than the elongation of light pulses reflected by the road surface. Accordingly, LIDAR systems disclosed herein may use pulse elongation characteristics of received light pulses to distinguish between light pulses reflected by debris and other small foreign objects and light pulses reflected by the road, for example, to detect and/or identify such debris and other small foreign objects left on the road surface.

FIG. 7B shows a flow chart depicting an example operation 710 for identifying debris on a road surface. The example operation 710 is described below with respect to the LIDAR system 100 of FIG. 1 for illustrative purposes only. One of ordinary skill in the art will recognize that the example operation 710 may be performed by any suitable LIDAR system or by any suitable LIDAR device and LIDAR controller according various implementations disclosed herein. The example operation 710 may include one or more operations, functions, or actions depicted by one or more of blocks 711-712, and may be performed with additional steps, with fewer steps, with steps in a different order, with steps in parallel, or any combination thereof. Thus, although the blocks 711-712 are illustrated in a sequential order, in other implementations, these blocks 711-712 may be performed in parallel, may be performed in a different order than those described herein, may be combined into fewer blocks, divided into additional blocks, removed from the example operation 710, or any combination thereof.

The example operation 710 may be part of, or appended to, the example operation 700 of FIG. 7A. In some implementations, after performing operations corresponding to at least blocks 701-703 of FIG. 7A, the LIDAR system 100 may compare the determined pulse width with a pulse width of light reflected from a road surface to determine a pulse elongation difference value (711). In some implementations, the pulse width of light reflected from the road surface may be stored in a memory (such as the LUT 454 of FIG. 4B) of the LIDAR system 100. In some aspects, the pulse width of light reflected from the road surface may be determined during a calibration operation. In other aspects, the pulse width of light reflected from the road surface may be determined or derived from one or more previously received light pulses classified as reflections from the road surface.

The LIDAR system 100 may identify the surface as debris on the road surface based, at least in part, on the determined pulse elongation difference value (712). As mentioned above, the elongation of light pulses reflected by debris and other small foreign objects may be detectably different than the elongation of light pulses reflected by the road surface. Thus, the LIDAR system 100 may use the determined pulse elongation difference value to distinguish between light pulses reflected by debris and other small foreign objects and light pulses reflected by the road, for example, to detect and/or identify such debris and other small foreign objects left on the road surface.

The operations associated with block 712 of FIG. 7B may be performed by any suitable computing device or hardware and data processing apparatus. In some implementations, operations associated with block 712 of FIG. 7B may be performed by the LIDAR controller 130 of FIG. 1. In other implementations, operations associated with block 712 of FIG. 7B may be performed by a computing device external to the LIDAR system 100 of FIG. 1. In some other implementations, operations associated with block 712 of FIG. 7B may be performed by the remote computing device.

FIG. 8A shows a flow chart depicting an example operation 800 for comparing the determined pulse width of a received light pulse with a reference pulse width. The example operation 800 is described below with respect to the LIDAR system 100 of FIG. 1 for illustrative purposes only. One of ordinary skill in the art will recognize that the example operation 800 may be performed by any suitable LIDAR system or by any suitable LIDAR device and LIDAR controller according various implementations disclosed herein. The example operation 800 may include one or more operations, functions, or actions depicted by one or more of blocks 801-803, and may be performed with additional steps, with fewer steps, with steps in a different order, with steps in parallel, or any combination thereof. Thus, although the blocks 801-803 are illustrated in a sequential order, in other implementations, these blocks 801-803 may be performed in parallel, may be performed in a different order than those described herein, may be combined into fewer blocks, divided into additional blocks, removed from the example operation 800, or any combination thereof.

The LIDAR system 100 may determine a peak amplitude of the received light pulse (801), may select one of a plurality of reference pulse widths based on the determined peak amplitude (802), and may compare the determined pulse width with the selected reference pulse width (803). In some implementations, the plurality of reference pulse widths may be stored in a look-up table, and the determined peak amplitude may be used as a search key to retrieve a corresponding reference pulse width from the look-up table. In other implementations, the LIDAR system 100 may use any other suitable technique to determine the peak amplitude and/or to select the reference pulse width.

Figure 8B:
FIG. 8B shows a flow chart depicting an example operation for determining the pulse width of a received light pulse.

FIG. 8B shows a flow chart depicting an example operation 810 for determining the pulse width of a received light pulse. The example operation 810 is described below with respect to the LIDAR system 100 of FIG. 1 for illustrative purposes only. One of ordinary skill in the art will recognize that the example operation 810 may be performed by any suitable LIDAR system or by any suitable LIDAR device and LIDAR controller according various implementations disclosed herein. The example operation 810 may include one or more operations, functions, or actions depicted by one or more of blocks 811-812, and may be performed with additional steps, with fewer steps, with steps in a different order, with steps in parallel, or any combination thereof. Thus, although the blocks 811-812 are illustrated in a sequential order, in other implementations, these blocks 811-812 may be performed in parallel, may be performed in a different order than those described herein, may be combined into fewer blocks, divided into additional blocks, removed from the example operation 810, or any combination thereof.

The LIDAR system 100 may determine a first time at which a magnitude of the received light pulse rises above a value (811), and may determine a second time at which the magnitude of the received light pulse falls below the value (812). In some implementations, the LIDAR system 100 may determine the pulse width of the received light pulse based on a difference between the first and second determined times. In other implementations, the LIDAR system 100 may use any other suitable technique to determine first and second times.

Figure 8C:
FIG. 8C shows a flow chart depicting an example operation for retrieving a reference pulse width from memory.

FIG. 8C shows a flow chart depicting an example operation 820 for retrieving a reference pulse width. The example operation 820 is described below with respect to the LIDAR system 100 of FIG. 1 for illustrative purposes only. One of ordinary skill in the art will recognize that the example operation 820 may be performed by any suitable LIDAR system or by any suitable LIDAR device and LIDAR controller according various implementations disclosed herein. The example operation 820 may include one or more operations, functions, or actions depicted by one or more of blocks 821-822, and may be performed with additional steps, with fewer steps, with steps in a different order, with steps in parallel, or any combination thereof. Thus, although the blocks 821-822 are illustrated in a sequential order, in other implementations, these blocks 821-822 may be performed in parallel, may be performed in a different order than those described herein, may be combined into fewer blocks, divided into additional blocks, removed from the example operation 820, or any combination thereof.

The LIDAR system 100 may determine a peak amplitude of the received light pulse (821), and may retrieve the reference pulse width from a look-up table based on the determined peak amplitude (822). The LIDAR system 100 may use any suitable technique to determine the peak amplitude of the received light pulse. The look-up table may store a plurality of reference pulse widths each for a corresponding one of a plurality of different amplitude values. In some implementations, the reference pulse widths stored in the look-up table may be determined during a calibration operation (such as during part of a manufacturing process or quality control operation of the LIDAR system). In some aspects, each of the reference pulse widths may be determined by emitting a light pulse at a corresponding power level towards an orthogonal surface, determining the pulse width of the return light pulse reflected from the orthogonal surface, and storing the determined pulse width as the reference pulse width for a corresponding amplitude value in the look-up table. The peak amplitude value may be measured by the LIDAR system and/or may be determined or otherwise derived from the transmit power level of the emitted light pulse.

As used herein, a phrase referring to "at least one of" a list of items refers to any combination of those items, including single members. As an example, "at least one of: a, b, or c" is intended to cover: a, b, c, a-b, a-c, b-c, and a-b-c.

The various illustrative logics, logical blocks, modules, circuits and algorithm processes described in connection with the implementations disclosed herein may be implemented as electronic hardware, computer software, or combinations of both. The interchangeability of hardware and software has been described generally, in terms of functionality, and illustrated in the various illustrative components, blocks, modules, circuits and processes described above. Whether such functionality is implemented in hardware or software depends upon the particular application and design constraints imposed on the overall system.

The hardware and data processing apparatus used to implement the various illustrative logics, logical blocks, modules and circuits described in connection with the aspects disclosed herein may be implemented or performed with a general purpose single- or multi-chip processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, or, any conventional processor, controller, microcontroller, or state machine. A processor also may be implemented as a combination of computing devices (such as a combination of a DSP and a microprocessor, a plurality of microprocessors, one or more microprocessors in conjunction with a DSP core, or any other such configuration). In some implementations, particular processes and methods may be performed by circuitry that is specific to a given function.

In one or more aspects, the functions described may be implemented in hardware, digital electronic circuitry, computer software, firmware, including the structures disclosed in this specification and their structural equivalents thereof, or in any combination thereof. Implementations of the subject matter described in this specification also can be implemented as one or more computer programs (such as one or more modules of computer program instructions) encoded on a computer storage media for execution by, or to control the operation of, data processing apparatus.

If implemented in software, the functions may be stored on or transmitted over as one or more instructions or code on a computer-readable medium. The processes of a method or algorithm disclosed herein may be implemented in a processor-executable software module which may reside on a computer-readable medium. Computer-readable media includes both computer storage media and communication media including any medium that can be enabled to transfer a computer program from one place to another. A storage media may be any available media that may be accessed by a computer. By way of example, and not limitation, such computer-readable media may include RAM, ROM, EEPROM, CD-ROM or other optical disk storage, magnetic disk storage or other magnetic storage devices, or any other medium that may be used to store desired program code in the form of instructions or data structures and that may be accessed by a computer. Also, any connection can be properly termed a computer-readable medium. Combinations of the above should also be included within the scope of computer-readable media. Additionally, the operations of a method or algorithm may reside as one or any combination or set of codes and instructions on a machine readable medium and computer-readable medium, which may be incorporated into a computer program product.

Various modifications to the implementations described in this disclosure may be readily apparent to those skilled in the art, and the generic principles defined herein may be applied to other implementations without departing from the spirit or scope of this disclosure. Thus, the claims are not intended to be limited to the implementations shown herein, but are to be accorded the widest scope consistent with this disclosure, the principles and the novel features disclosed herein.

What is claimed is:

1. A method comprising:
    emitting a light pulse into an environment along an emission direction;
    receiving a return light pulse corresponding to reflection of the emitted light pulse by a surface in the environment;
    determining an amount of pulse elongation of the received light pulse based on:
        a first time at which the magnitude of the received light pulse rises above a first value; and
        a second time at which the magnitude of the received light pulse falls below a second value, wherein the second value is different from the first value; and
    determining that the surface comprises at least one of: a surface that is non-orthogonal relative to the emission direction or air particulates associated with a volumetric medium in the environment, wherein the determination is based, at least in part, on the determined amount of pulse elongation.

2. The method of claim 1, wherein the amount of pulse elongation of the received light pulse is further determined based on:
    a rising edge time or timing of the received light pulse; and
    a falling edge time or timing of the received light pulse.

3. The method of claim 1, wherein the amount of pulse elongation of the received light pulse is further determined based on a peak amplitude of the received light pulse.

4. The method of claim 1, wherein the second value is less than the first value.

5. The method of claim 1, further comprising:
    receiving a plurality of additional return light pulses; and
    dynamically adjusting the first value or the second value based on the reception of the plurality of additional return light pulses.

6. The method of claim 1, further comprising:
    determining a pulse elongation difference value; and
    identifying the surface as debris on a road surface based, at least in part, on the determined pulse elongation difference value.

7. The method of claim 1, further comprising generating a corresponding point in a point cloud indicative of the surface in the environment based on the determined amount of pulse elongation.

8. A LIDAR system comprising:
    a light emitter configured to emit a light pulse into an environment along an emission direction;
    a photodetector configured to receive a return light pulse corresponding to reflection of the emitted light pulse by a surface in the environment;
    at least one processing channel configured to determine an amount of pulse elongation of the received light pulse based on:
        a first time at which the magnitude of the received light pulse rises above a first value; and
        a second time at which the magnitude of the received light pulse falls below a second value, wherein the second value is different from the first value; and a controller configured to determine that the surface comprises at least one of: a surface that is non-orthogonal relative to the emission direction or air particulates associated with a volumetric medium in the environment, wherein the determination is based, at least in part, on the determined amount of pulse elongation.

9. The LIDAR system of claim 8, wherein the amount of pulse elongation of the received light pulse is further determined based on:
a rising edge time or timing of the received light pulse; and
a falling edge time or timing of the received light pulse.

10. The LIDAR system of claim 8, wherein the amount of pulse elongation of the received light pulse is further determined based on a peak amplitude of the received light pulse.

11. The LIDAR system of claim 8, wherein the second value is less than the first value.

12. The LIDAR system of claim 8,
wherein the photodetector is further configured to receive a plurality of light pulses, and
wherein the controller is further configured to dynamically adjust the first value or the second value based on the reception of the plurality of light pulses.

13. The LIDAR system of claim 8,
wherein the at least one processing channel is further configured to determine a pulse elongation difference value, and
wherein the controller is further configured to identify the surface as debris on a road surface based, at least in part, on the determined pulse elongation difference value.

14. The LIDAR system of claim 8, further comprising circuitry configured to generate a corresponding point in a point cloud indicative of the surface in the environment based on the determined amount of pulse elongation.

15. A vehicle comprising:
a light emitter configured to emit a light pulse into an environment along an emission direction;
a photodetector configured to receive a return light pulse corresponding to reflection of the emitted light pulse by a surface in the environment;
at least one processing channel configured to determine an amount of pulse elongation of the received light pulse based on:
a first time at which the magnitude of the received light pulse rises above a first value; and
a second time at which the magnitude of the received light pulse falls below a second value, wherein the second value is different from the first value; and
a controller configured to determine that the surface comprises at least one of: a surface that is non-orthogonal relative to the emission direction or air particulates associated with a volumetric medium in the environment, wherein the determination is based, at least in part, on the determined amount of pulse elongation.

16. The vehicle of claim 15, wherein the amount of pulse elongation of the received light pulse is further determined based on:
a rising edge time or timing of the received light pulse; and
a falling edge time or timing of the received light pulse.

17. The vehicle of claim 15, wherein the amount of pulse elongation of the received light pulse is further determined based on a peak amplitude of the received light pulse.

18. The vehicle of claim 15, wherein the second value is less than the first value.

19. The vehicle of claim 15,
wherein the photodetector is further configured to receive a plurality of light pulses, and
wherein the controller is further configured to dynamically adjust the first value or the second value based on the reception of the plurality of light pulses.

20. The vehicle of claim 15, further comprising circuitry configured to generate a corresponding point in a point cloud indicative of the surface in the environment based on the determined amount of pulse elongation.

* * * * *